United States Patent
Jaquet

(10) Patent No.: US 6,170,634 B1
(45) Date of Patent: Jan. 9, 2001

(54) APPARATUS AND METHOD FOR TEMPORARILY STORING OR BUFFERING OF PRODUCTS

(75) Inventor: Jacob Arnold Hendrik Frederick Jaquet, Valburg (NL)

(73) Assignee: EBM Techniek B.V. (NL)

( * ) Notice: Under 35 U.S.C. 154(b), the term of this patent shall be extended for 0 days.

(21) Appl. No.: 09/051,922

(22) PCT Filed: Oct. 28, 1996

(86) PCT No.: PCT/NL96/00424

§ 371 Date: Apr. 23, 1998

§ 102(e) Date: Apr. 23, 1998

(87) PCT Pub. No.: WO97/15514

PCT Pub. Date: May 1, 1997

(30) Foreign Application Priority Data

Oct. 26, 1995 (NL) .................................................... 1001505
Apr. 10, 1996 (NL) .................................................... 1002840

(51) Int. Cl.$^7$ ..................................................... B65G 1/00
(52) U.S. Cl. ..................................... 198/347.1; 198/465.1
(58) Field of Search ............................. 198/347.1, 347.2, 198/465.1, 795, 867.11, 867.13, 867.14, 803.14

(56) References Cited

U.S. PATENT DOCUMENTS 3,622,043   11/1971   Chotard .
4,359,149 * 11/1982 Erlichman et al. ................ 198/347.1
5,232,081 *  8/1993 Kanamori ....................... 198/347.1 X
5,253,745 * 10/1993 Bergh et al. ..................... 198/867.11
5,441,146 *  8/1995 Ziegler .......................... 198/347.2 X
5,553,988 *  9/1996 Horn et al. ..................... 198/465.1 X
5,690,463 * 11/1997 Yoshie ........................... 198/347.1 X

FOREIGN PATENT DOCUMENTS 44 00 925   7/1995   (DE) .
0 316 990   5/1989   (EP) .
0 496 046   7/1992   (EP) .
0 531 610   3/1993   (EP) .
2 227 200  11/1974   (FR) .

* cited by examiner

Primary Examiner—James R. Bidwell
(74) Attorney, Agent, or Firm—Dykema Gossett PLLC

(57) ABSTRACT

An apparatus for temporarily storing or buffering and/or setting the pitch of products, comprised of a conveyor belt, a product carrier for transporting by the conveyor belt and for carrying a plurality of products, a feed conveyor for feeding products into the product carrier at a first predetermined location of the conveyor belt, and a discharge element such as a robot, top loader or pushing member for discharging the products from the product carrier at a second predetermined location a distance from the first predetermined location.

18 Claims, 34 Drawing Sheets

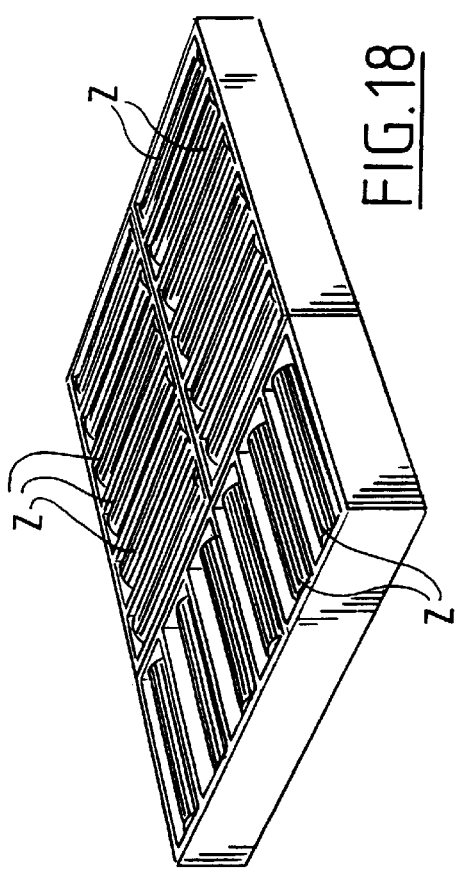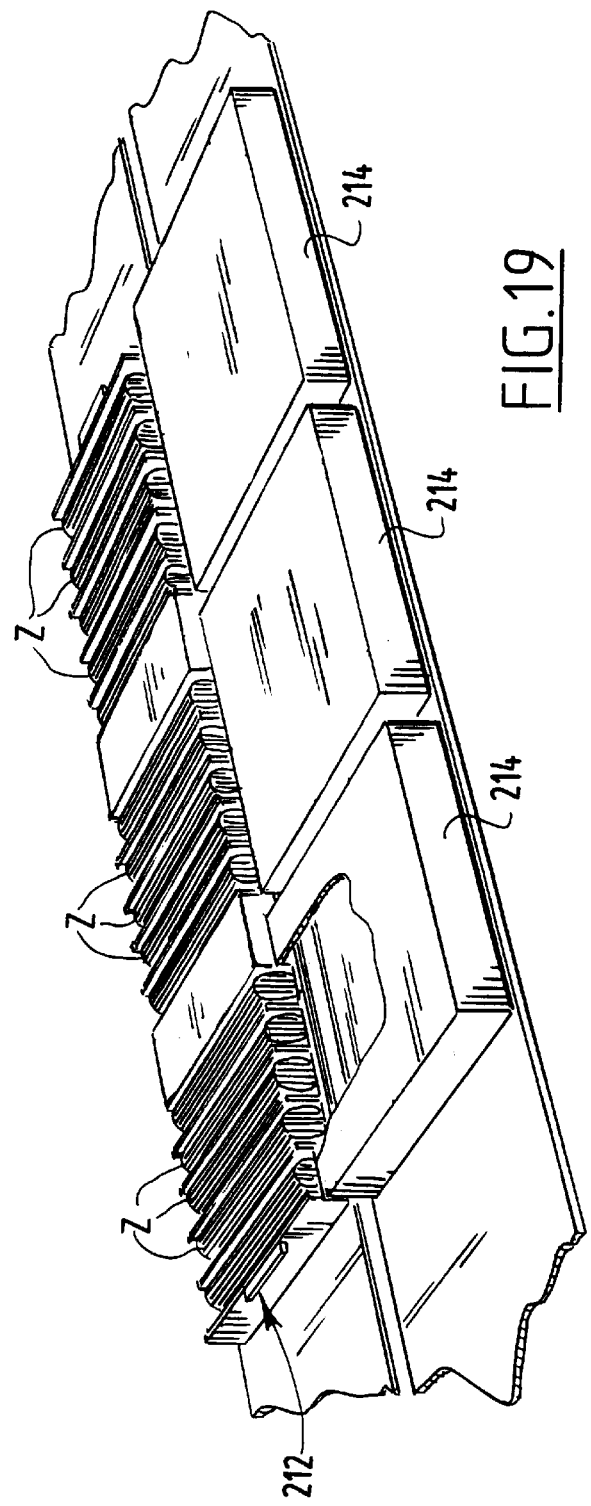

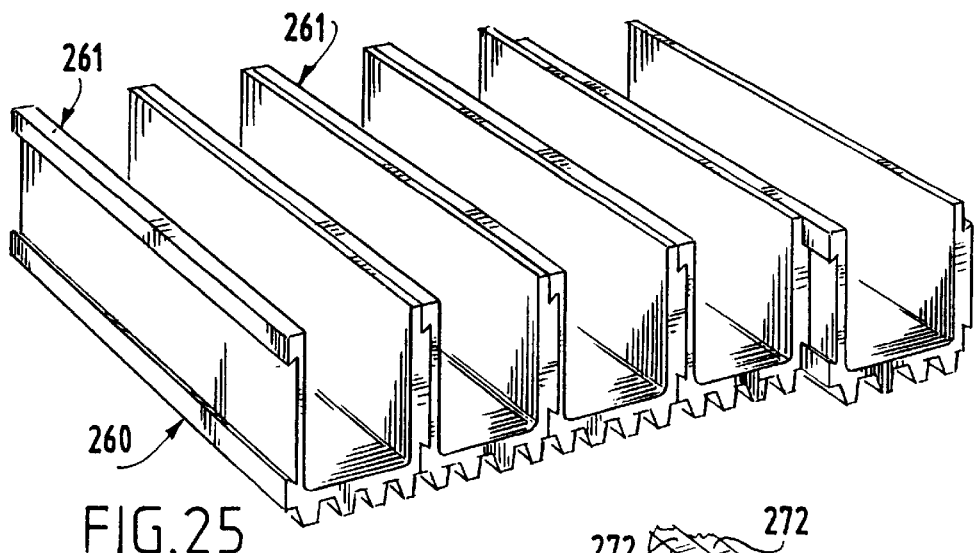
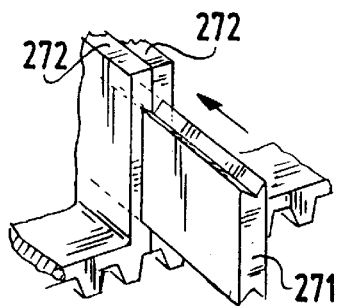
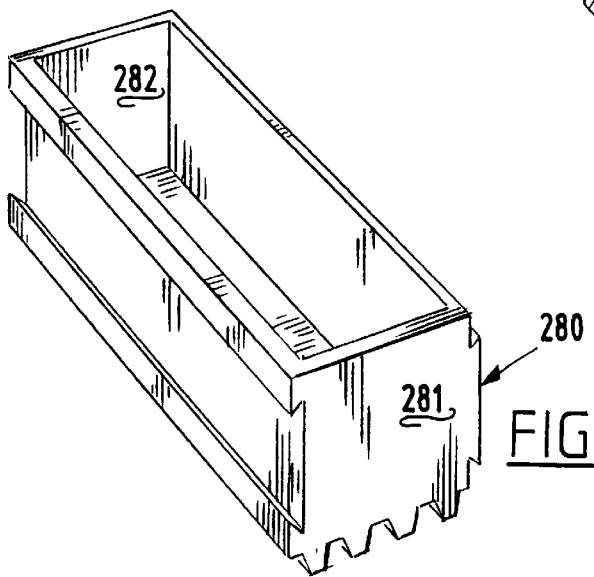
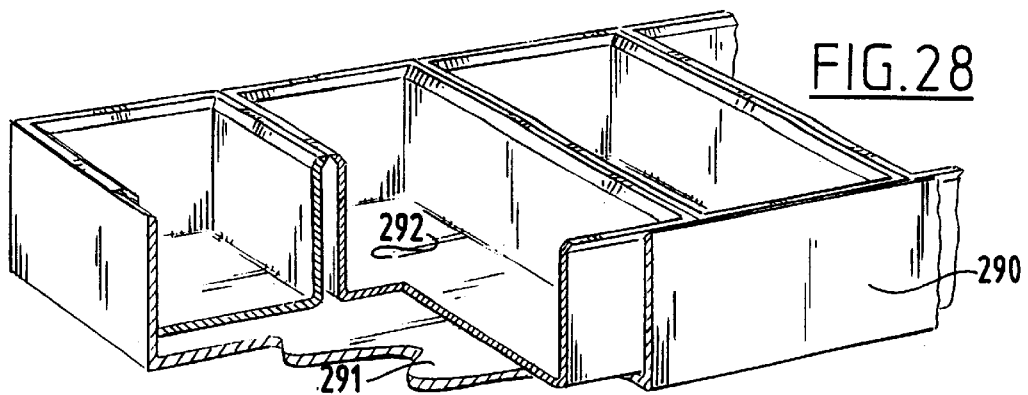

APPARATUS AND METHOD FOR TEMPORARILY STORING OR BUFFERING OF PRODUCTS

Packaged or non-packaged (naked) products are usually temporarily buffered or collected from a production supply for the subsequent fully or partially automatic further processing, such as measuring, counting, packaging, coding etc., in an apparatus which is especially suitable for this purpose. An example of such an apparatus is described in applicant's European patent 0 509 583.

With this known apparatus products supplied with random spacing can be set at an almost constant pitch, which is important for the above mentioned further processing. In order to obtain a sufficiently high capacity, wherein for instance six hundred products per minute are fed and discharged, all components of this known apparatus must meet very high standards, particularly because of the great decelerations and accelerations taking place at each step of feed and discharge.

The present invention provides an apparatus for temporarily storing or buffering and/or setting to pitch of products, comprising:
- a conveyor belt;
- carrying means for transporting by the conveyor belt for carrying a plurality of products;
- infeed means for feeding products into the carrying means at a predetermined location of the conveyor belt; and
- outfeed means for discharging the products from the carrying means at a second predetermined location at a distance from the above said location.

Because the above mentioned accelerations and decelerations only need take place at feed and discharge and not in the case of the conveyor belt on which the product carrying means are transported, a simple and therefore less expensive storage/buffer apparatus is provided by the present invention.

The carrying means preferably comprise a product carrier for receiving a plurality of products fed mutually adjacently, which product carriers can then be transported over the conveyor belt at relatively low speed.

It is important that the product carriers are positioned precisely in relation to the infeed means and outfeed means during feed and discharge of products respectively.

Preferred embodiments of the product carriers comprise a tooth track on the underside of a product carrier, suction means close to an infeed location, or a groove or a pin on a product carrier whereby transport thereof can take place a in precise manner.

Through use of the product carrier, an extremely flexible apparatus and method can be applied in accordance with conditions desired by the user.

The present invention further provides a method and a product carrier for use in the apparatus and method.

The product carrier is preferably constructed from standardized carrier elements and a plurality of the product carriers can be releasably connectable to each other.

Further advantages, features and details of the present invention will be elucidated on the basis of the following description of preferred embodiments thereof, with reference to the annexed drawings, wherein:

FIG. 18 is a view in perspective of products in a carrying member;

FIG. 19 shows a view in perspective of a plurality of product carrying means disposed mutually adjacently;

FIG. 25 shows a perspective view of an alternative for the connection of carrying elements of FIG. 24;

FIG. 26 shows a perspective view of an alternative carrying element;

FIG. 27 shows a perspective view of another preferred embodiment of a product carrying element for use in the apparatus and method according to the present invention;

FIG. 28 shows a view in perspective of a further preferred embodiment of product carrying elements for use in the apparatus according to the present invention;

Figure 1:
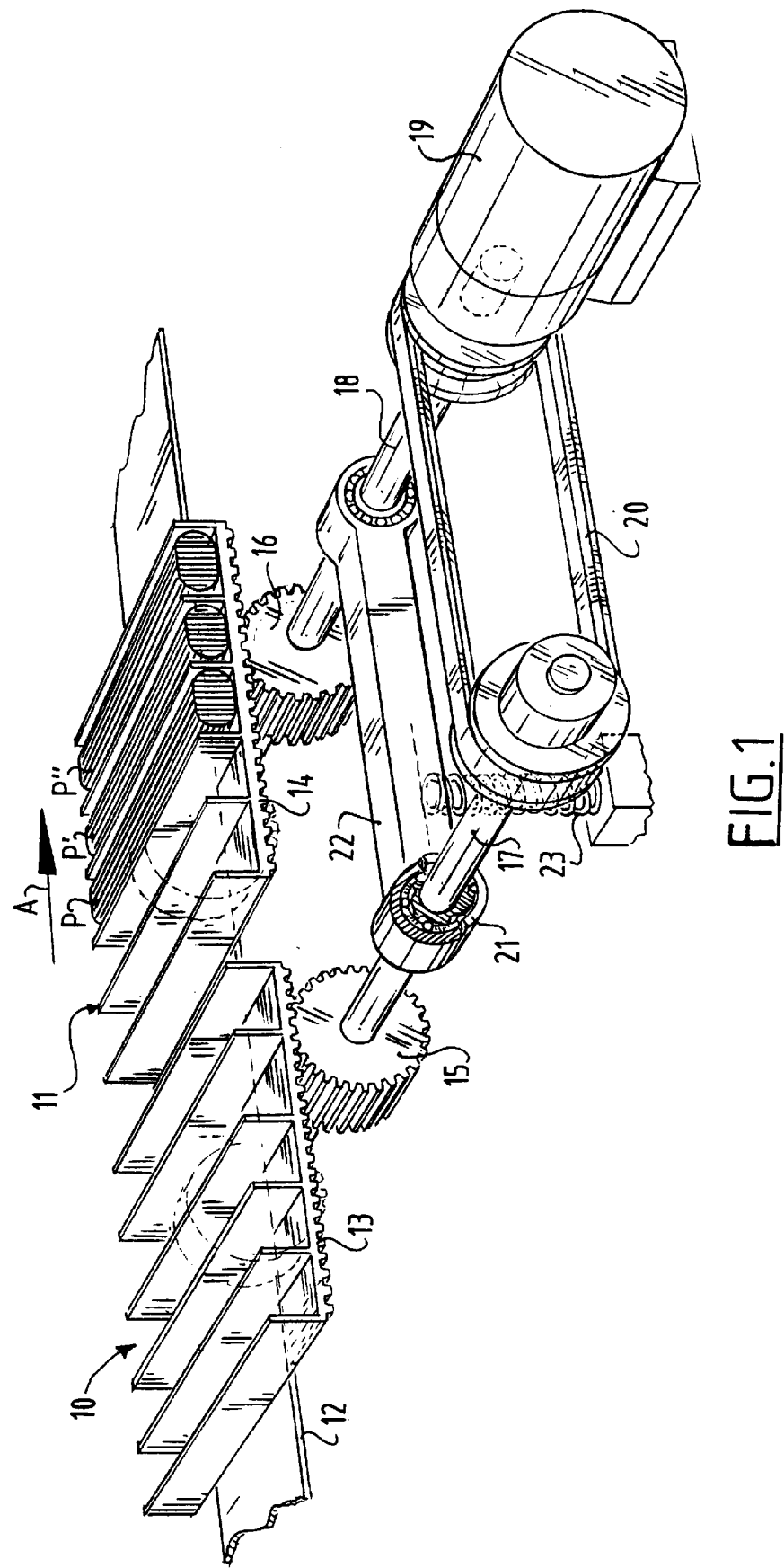
FIG. 1 shows a view in perspective of an infeed station for use in an apparatus according to the present invention.

In a first preferred embodiment (FIG. 1) of the apparatus and method according to the present invention, product carrying elements 10, 11 are fed onto a conveyor belt 12. The underside the product carriers are provided each with a tooth track 13, 14. The product carriers 10, 11 are transported in the direction of arrow A by means of pinions 15, 16 which engage on racks and which are connected via shafts 17, 18 to an electric stepping motor 19. The drive of shaft 17 takes place via a toothed belt 20, wherein it is recommended that shaft 17 is driven at slightly greater speed than shaft 18 by means of a correctly chosen transmission ratio. Shaft 17 is further provided with a slip coupling 21. It is important that product carriers 10, 11 can be filled successively in accurate manner with products P, P', P". By causing toothed wheel 15 to run faster, the product carrier 11 is caught up by product carrier 10 and the latter can connect precisely onto product carrier 11 at the infeed station. The slip coupling 21 prevents the product carrier 10 from pushing product carrier 11 further along in the connected position. Toothed wheel 15 is pressed firmly into the toothing 13 by a spring 23 which is arranged on a frame part 22.

Depending on the process, the product carriers 10 and 11 can be driven stepwise or at a more continuous speed.

Figure 2:
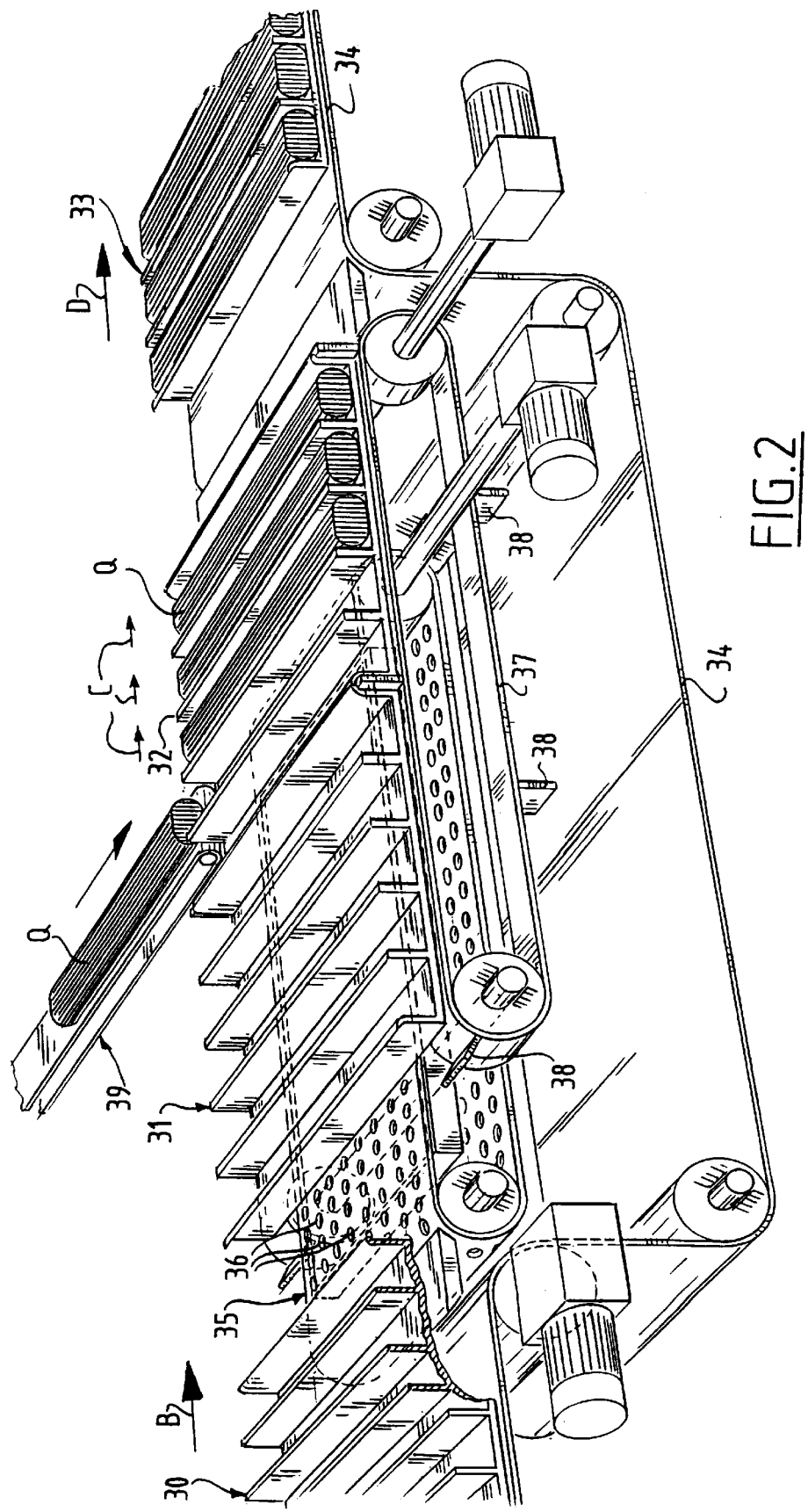
FIG. 2 shows a view in perspective of a second preferred embodiment of an infeed station according to the present invention.

In the infeed station according to FIG. 2 the product carriers 30, 31, 32, 33 are transported in the direction of arrows B, C and D and supplied and discharged using a conveyor belt 34. A conveyor belt 35 provided with suction apertures 36 is driven faster than conveyor belt 34 such that product carrier 30 is moved toward product carrier 31 in an accelerated manner and held fixedly by suction through apertures 36. A further conveyor 37 provided with carriers 38 ensures that the product carriers 30, 31 are moved at the correct (stepped or continuous) speed to a position close to a feed conveyor 39 for feeding products Q into the product carriers 30, 31. The final position of the product carriers 30, 31 relative to the feed conveyor 39 can be determined by the carriers 38 and the speed of the drive belt 37, which is slightly lower than the speed of belt 35 whereby some slip of the product carriers 30, 31 occurs relative to conveyor 35. The degree of suction through the suction apertures 36 must be adapted accordingly.

Figure 3:
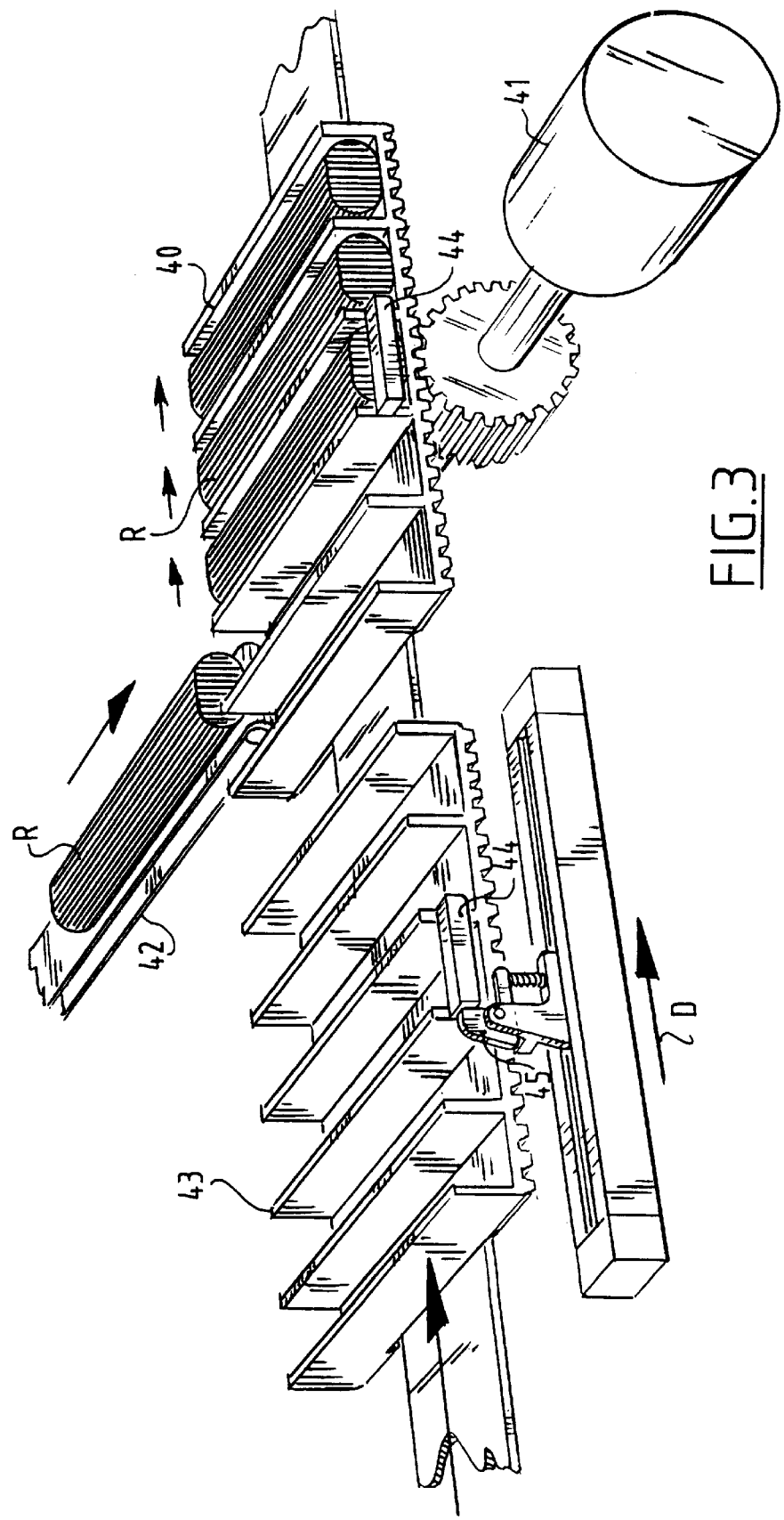
FIG. 3 shows a view in perspective of a third preferred embodiment of an infeed station according to the present invention.

In the embodiment of FIG. 3 products R are fed into a product carrier 40 which is preferably driven intermittently using an electric motor, in each case until an opening of the product carrier 40 arrives in front of a feed conveyor 42. The product carrier 40 (and corresponding product carrier 43) are each provided with a cam 44, the presence of which is detected by a control system (not shown) by means of a ratchet 45.

When cam 44 has passed ratchet 45 the product carrier 43 is moved in accelerated manner in the direction of the arrow B using the rear part of ratchet 45 and the cam 44, for instance using an air cylinder, until product carrier 43 connects seamlessly to the product carrier 40.

Figure 4:
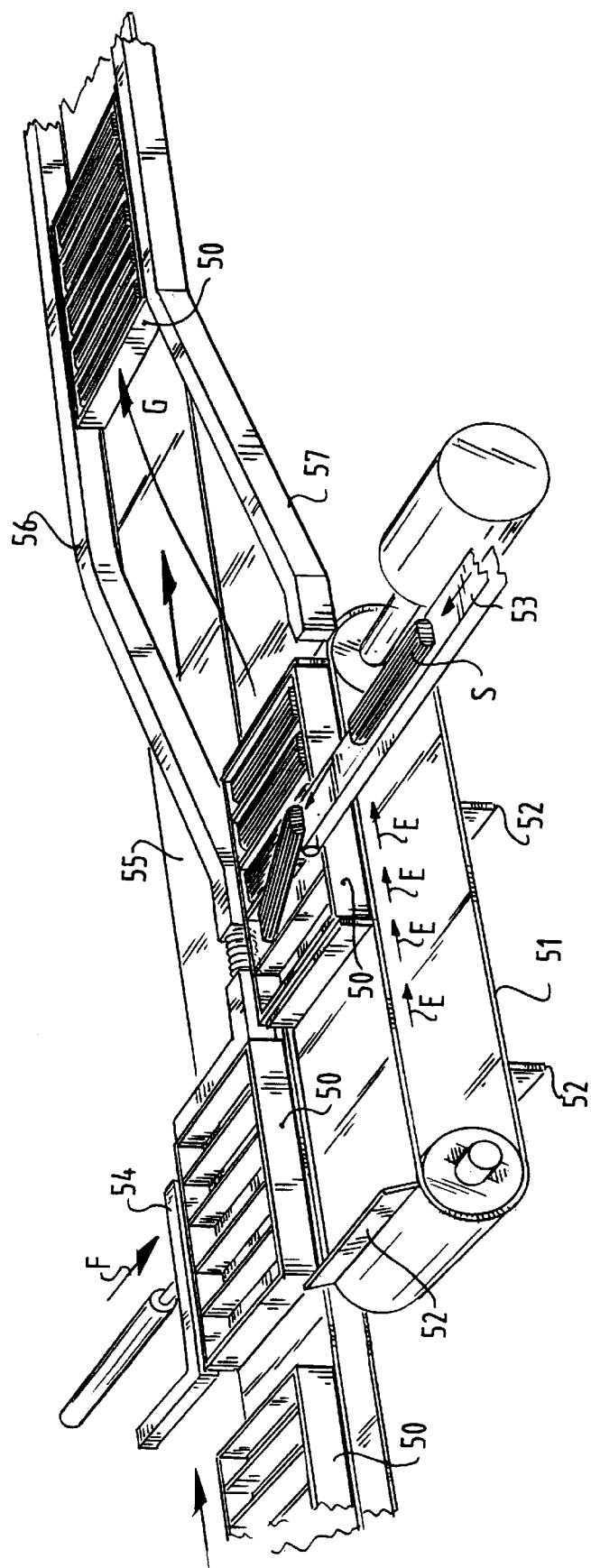
FIG. 4 shows a view in perspective of a fourth preferred embodiment of an infeed station according to the present invention.

At the loading-station according to FIG. 4, a product carrier 50 is driven intermittently as according to arrows E by a conveyor 51 with carriers 52. During the standstill period the product carriers 50 can be loaded with products S via feed conveyor 53. Using a pushing member 54 one product carrier 50 at a time is pushed from the main conveyor belt 55 in the direction of the arrow F onto the final conveyor 51, while it is guided back as according to arrow G onto the main conveyor belt 55 using guides 56 and 57.

Figure 5:
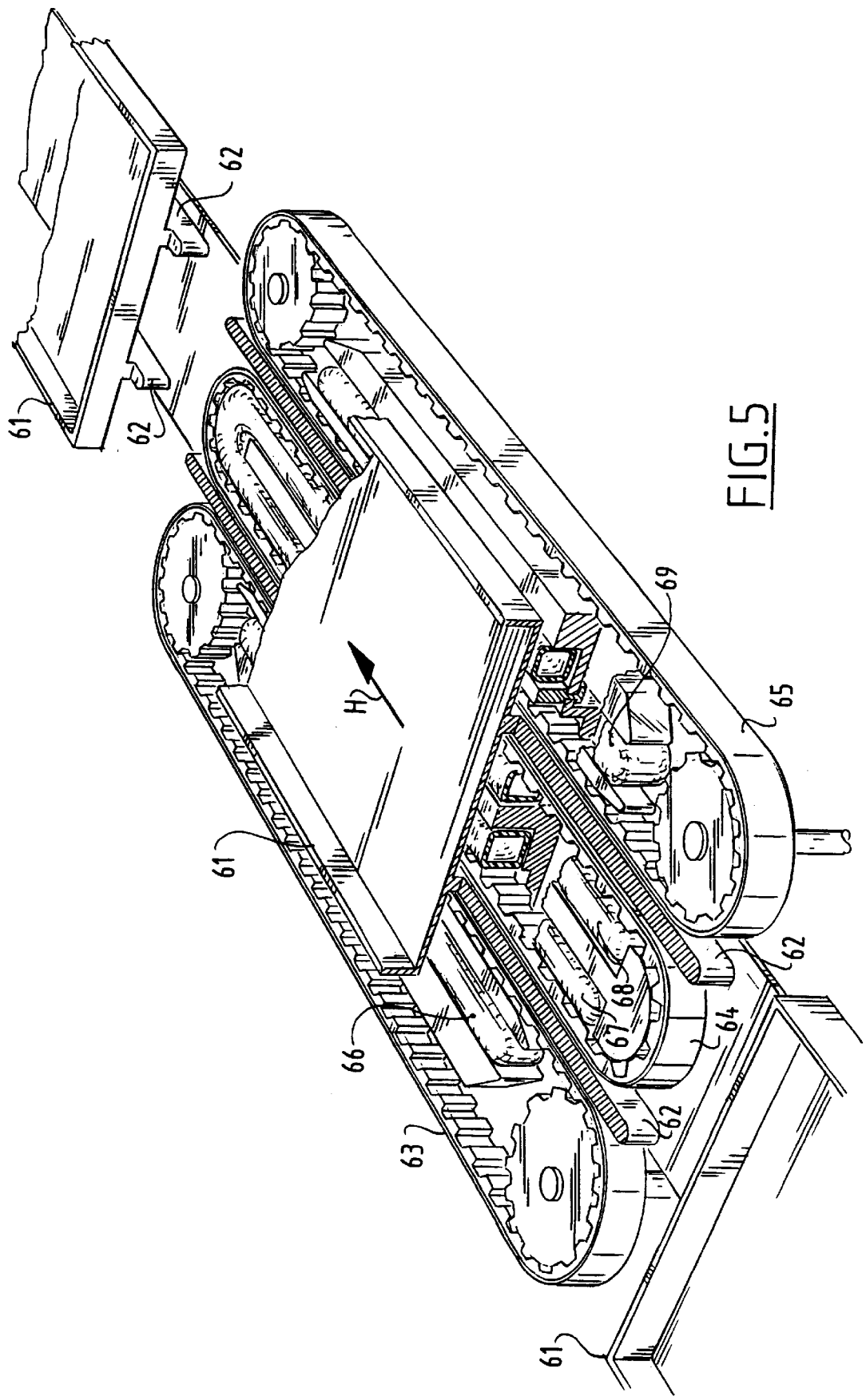
FIG. 5 shows a view in perspective of a fifth preferred embodiment of an infeed station for use in the present invention.

In the embodiment of FIG. 5 product carriers 61 are provided on the underside with gripping elements 62 which are gripped on both sides by belts 63, 64 and 65 respectively. These belts 63, 64, 65 are pushed against the gripping elements 62 using bellows members 66, 67, 68 and 69 which are filled with liquid or gaseous medium and which are brought under pressure in each case during transport in the direction of the arrow H.

In a manner not shown, the infeed of a product into product carrier 61 is preferably determined using a photocell, whereafter transport takes place intermittently using belts 63–65 and bellows members 66–69. In this embodiment the product carriers 61 do not have to connect to each other seamlessly.

Figure 6:
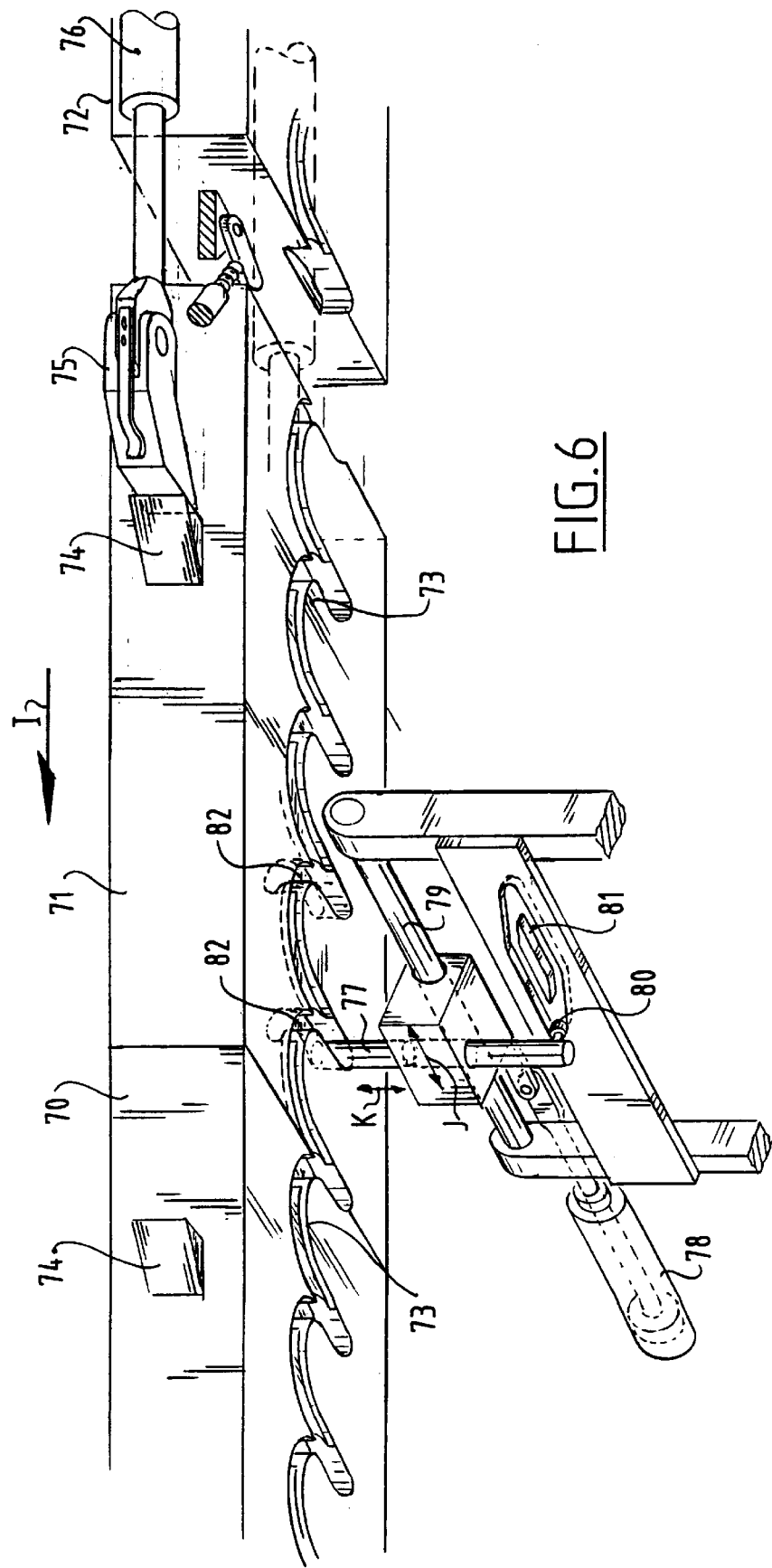
FIG. 6 shows a view in perspective of a sixth preferred embodiment of an infeed station according to the present invention.

In the embodiment of FIG. 6 the product carriers 70, 71 and 72 being moved forward in the direction of arrow I are provided with a guide groove 73 on the underside thereof. The product carriers 70, 71, 72 are provided in each case with a cam 74 onto which engages a pusher part 75 which is pushed by pushing cylinder 76. The groove 73 engages a pin part 77 which is moved reciprocally according to arrow J along slide rod 79 using a cylinder 78. The underside of pin 77 is guided in a curved path 81 using a wheel 80, whereby pin 77 is also moved up and down as according to K. Portions 82 of groove 73 are embodied in each case slightly deeper than the other parts thereof in accordance with the guiding in the curve path 81.

Through co-action of cylinders 76 and 78 the product carriers 70 and 71 are further displaced through one cycloid curve of groove 73 at each reciprocal movement of the pin 77, which displacement corresponds with an infeed position for a product in product carrier 71.

In the case of the drive of the product carrier shown in FIG. 6, gas or liquid cylinders can suffice for the driving.

Figure 7:
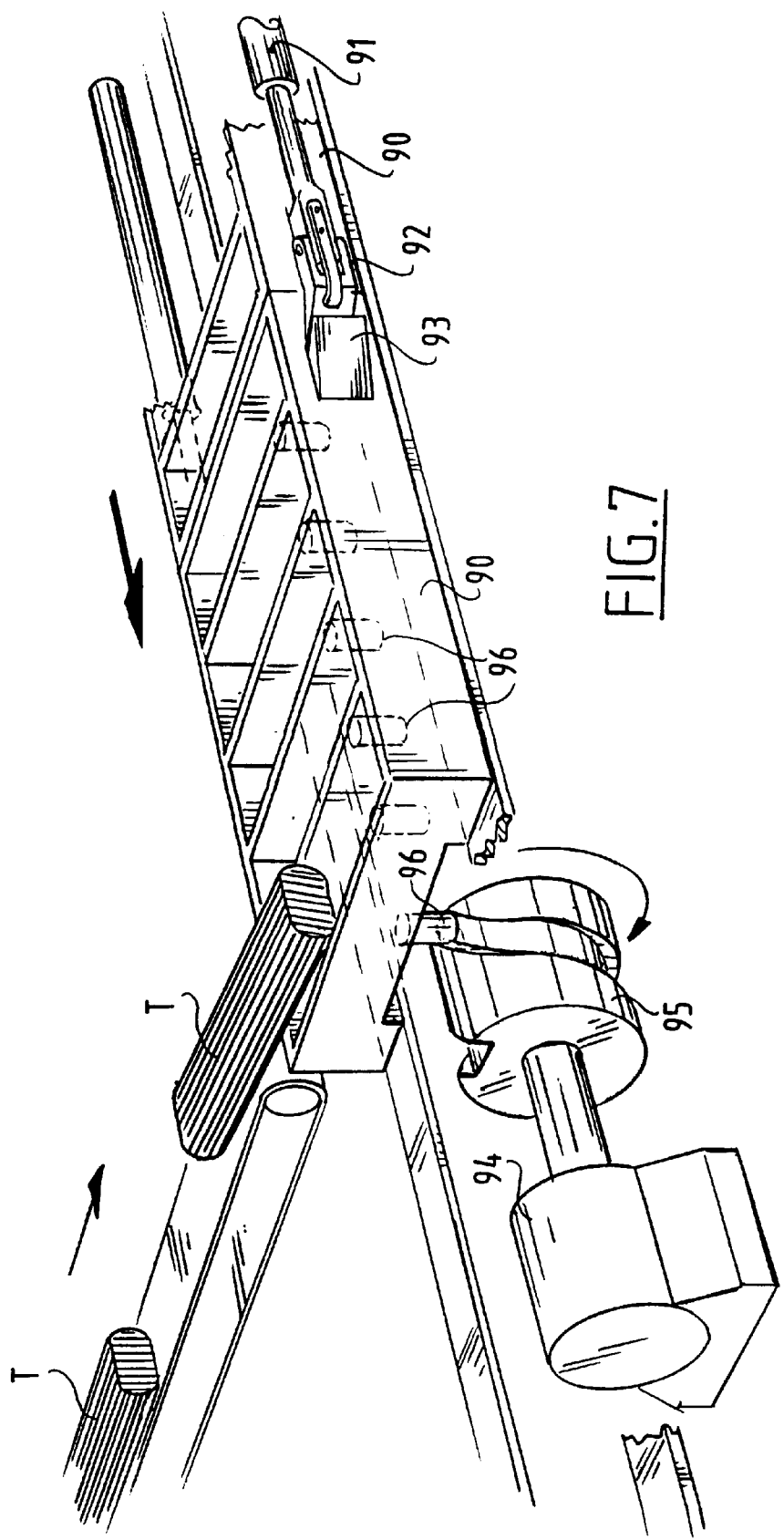
FIG. 7 shows a view in perspective of a seventh preferred embodiment of an infeed station according to the present invention.

In the embodiment according to FIG. 7 the displacement through one infeed position for feeding products T above product carriers 90 is realized in co-action with a pushing cylinder 91, a pusher part 92 of which engages on protrusion 93, and a curve roller 95 driven by an electric motor 94 in the curve of which a pin part 96 engages in each case on the underside of the product carriers.

Figure 8:
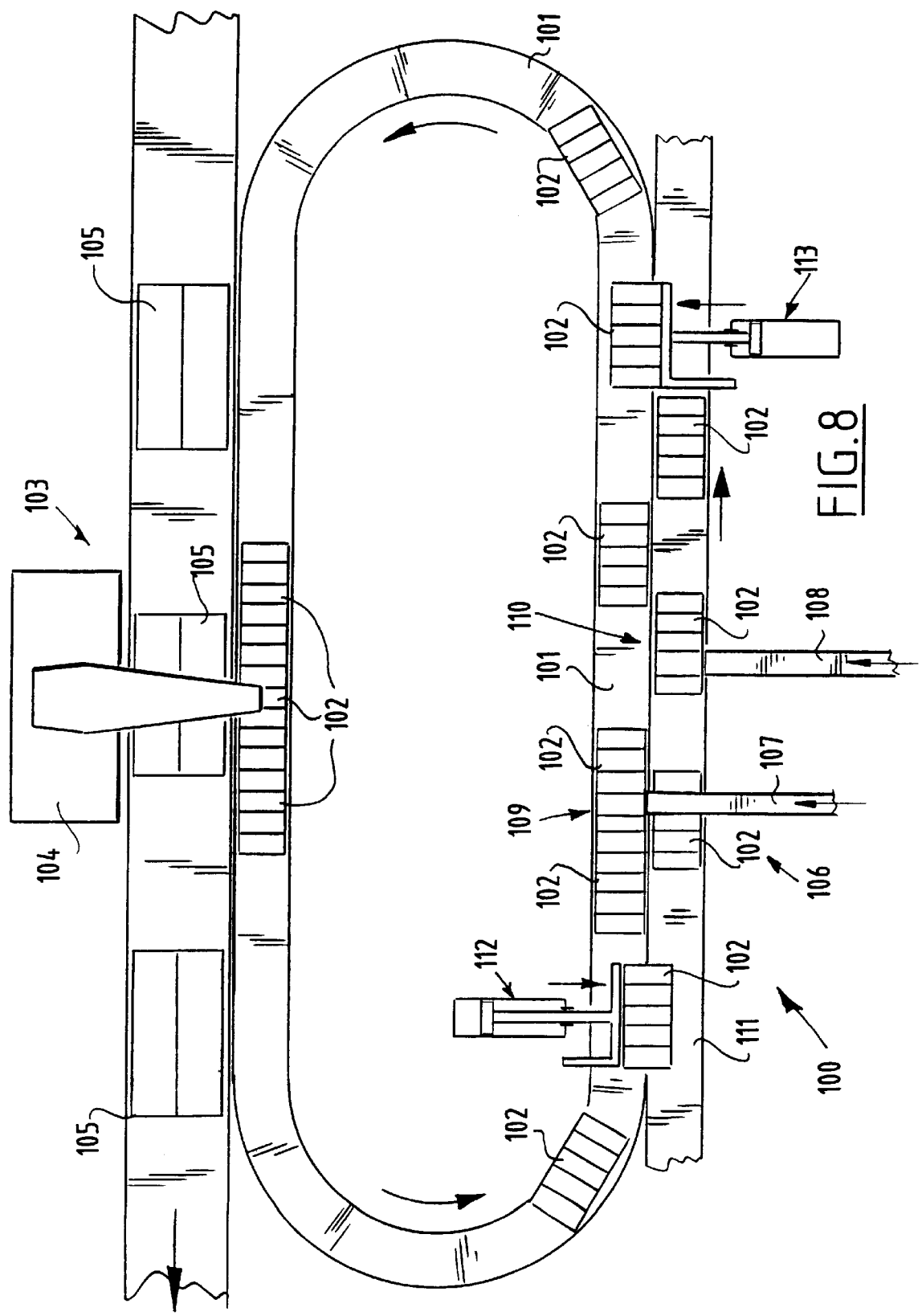
FIG. 8 shows a top view of an apparatus and method according to the present invention.

An apparatus 100 as according to FIG. 8 comprises a main conveyor belt 101 driven substantially at constant speed on which product carriers 102 are discharged at the outfeed station 103 using discharge device 104, such as a so-called top loader, in (cardboard) boxes 105. On the supply side 106 are placed two feed conveyors 107, 108 with which the product carriers 102 must be filled with products. In this arrangement each of the embodiments shown in FIGS. 1–7 can be used for the infeed stations 109, 110. In order to enable simultaneous operation with two infeed stations a conveyor 111 is placed adjacent the main conveyor belt 101, to which conveyor 111 product carriers are fed by means of a pushing device 112, are product carriers are returned to the main conveyor belt 101 using a second pushing device 113.

In this arrangement according to FIG. 8 it is therefore possible to feed products into product carriers 102 with a double infeed unit without the speed of the main conveyor belt 101 having to correspond with the speed of this infeed, whereby less stringent requirements are made of the components of this main conveyor belt 101 and whereby the arrangement enables a flexible adaptation in determined production environments.

Figure 9:
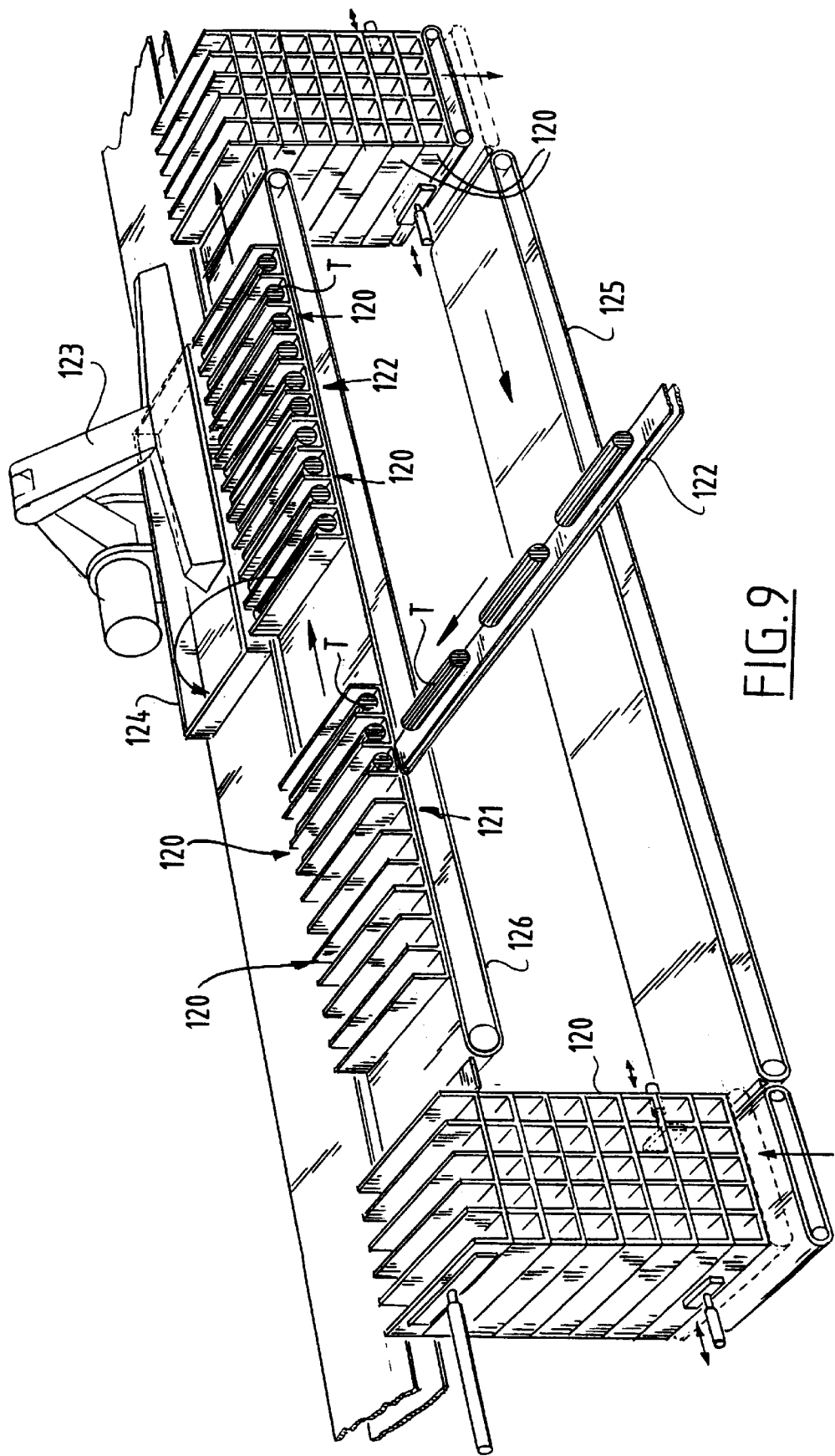
FIG. 9 shows a view in perspective of an alternative embodiment of the apparatus and method according to the present invention.

In the compact arrangement of FIG. 9 product carriers 120 are filled with products T from a supply conveyor 122 at an infeed station 121 and emptied at an outfeed station 122, using a pick-and-place robot 123, into a box 124 for further processing of the products T. The emptied product carriers 120 are transported back via a return conveyor 125, whereafter they can be fed again onto the main conveyor belt 126 on the left-hand side 9.

Figure 10:
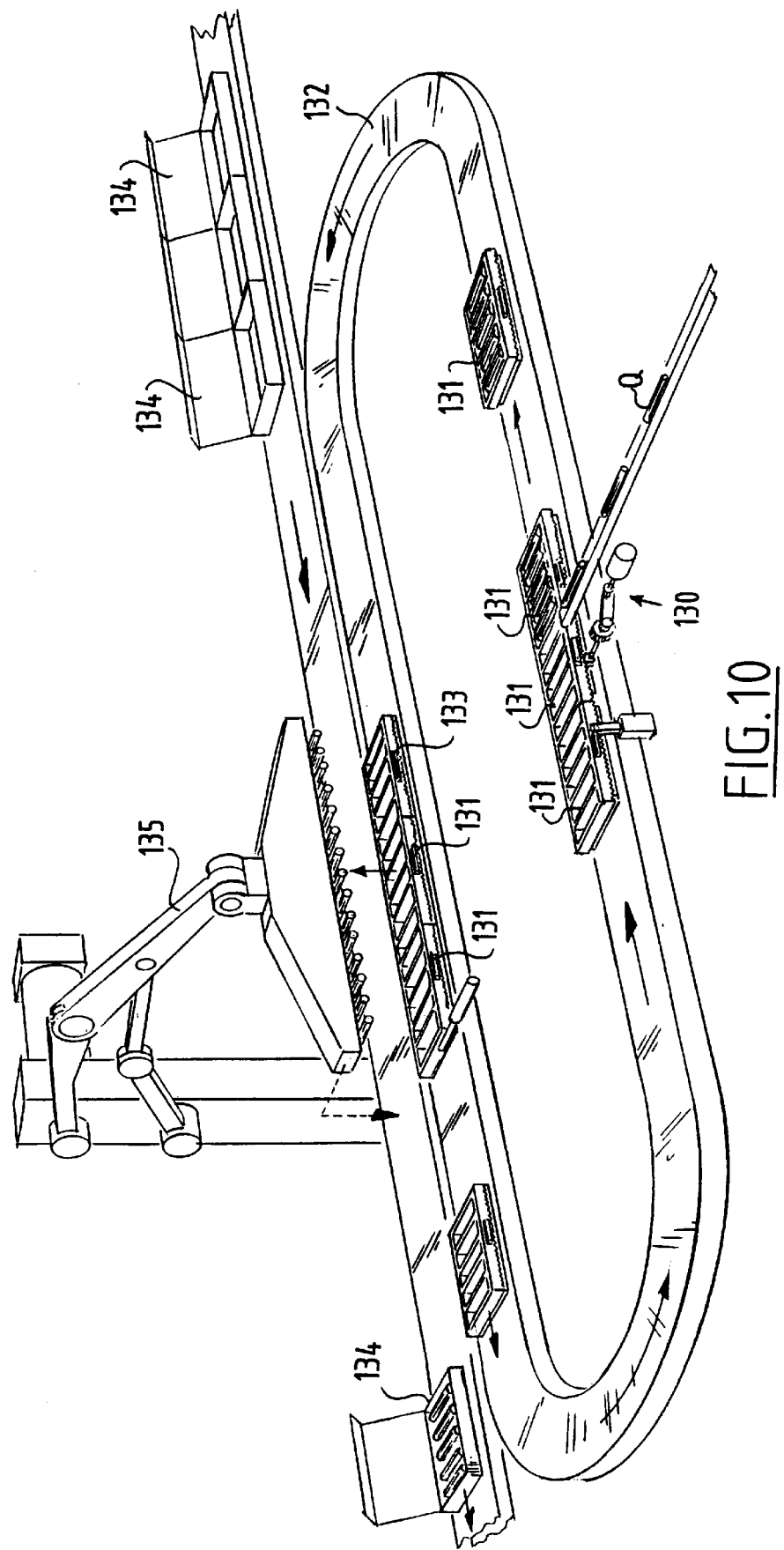
FIG. 10 shows a top view of a preferred embodiment of an apparatus according to the present invention.

FIG. 10 illustrates an arrangement wherein products Q are fed into product carriers 131 at an infeed station 130 and subsequently transported via the main conveyor belt 132 to an outfeed station 133, taken from the product carriers 131 and placed into packagings 134 using a top loader 135.

Figure 11:
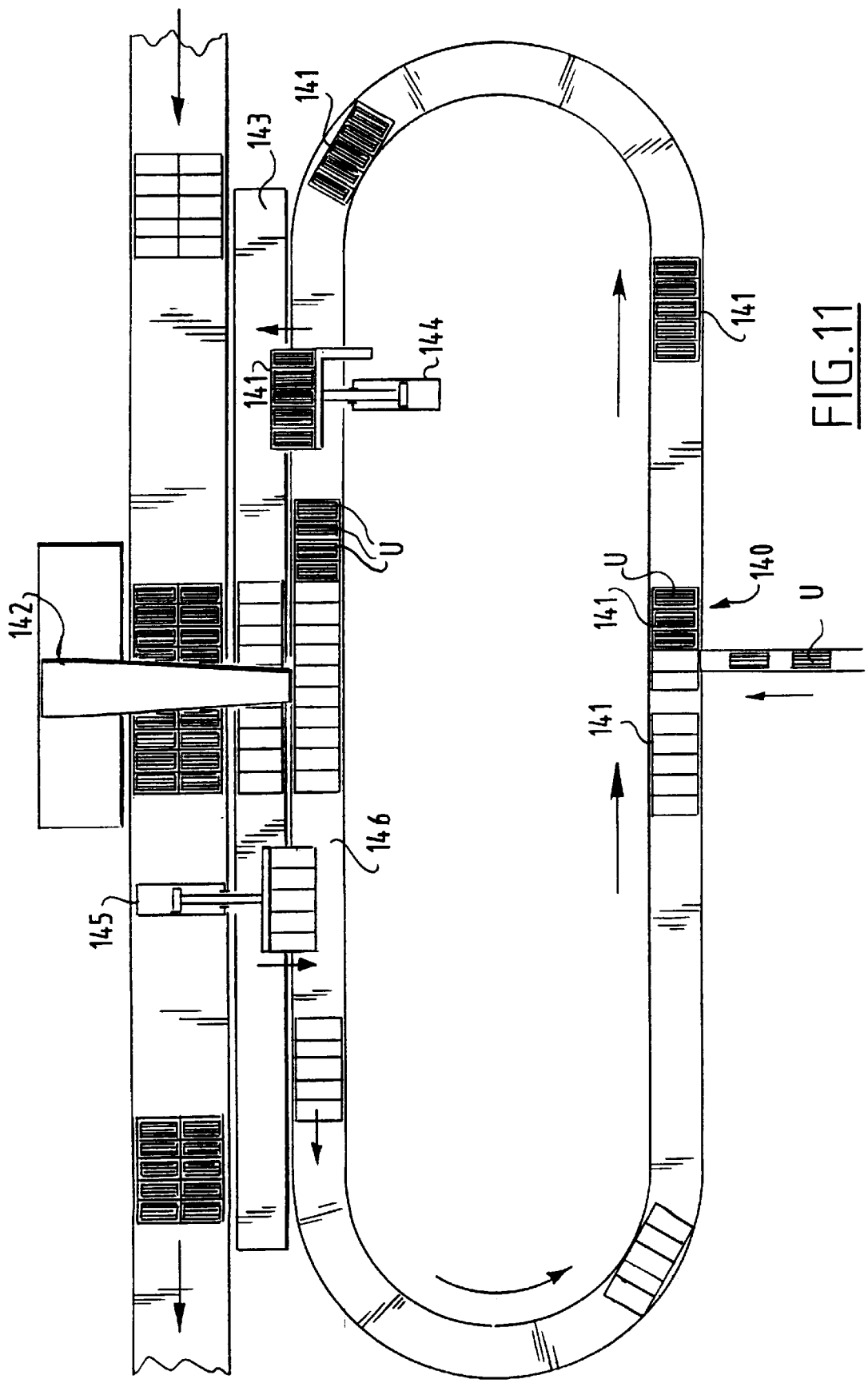
FIG. 11 shows a top view of a further embodiment of the apparatus and method according to the present invention.

In the arrangement of FIG. 11, use is made of a single infeed station 140 to feed products U into product carriers 141, while the speed of a robot 142 is utilized optimally by causing discharge of the products from the product carriers on the main conveyor belt 146 as well as on an adjacently disposed, substantially parallel conveyor belt 143, on which product carriers 141 are likewise supplied and discharged using pushing members 144, 145.

Figure 12:
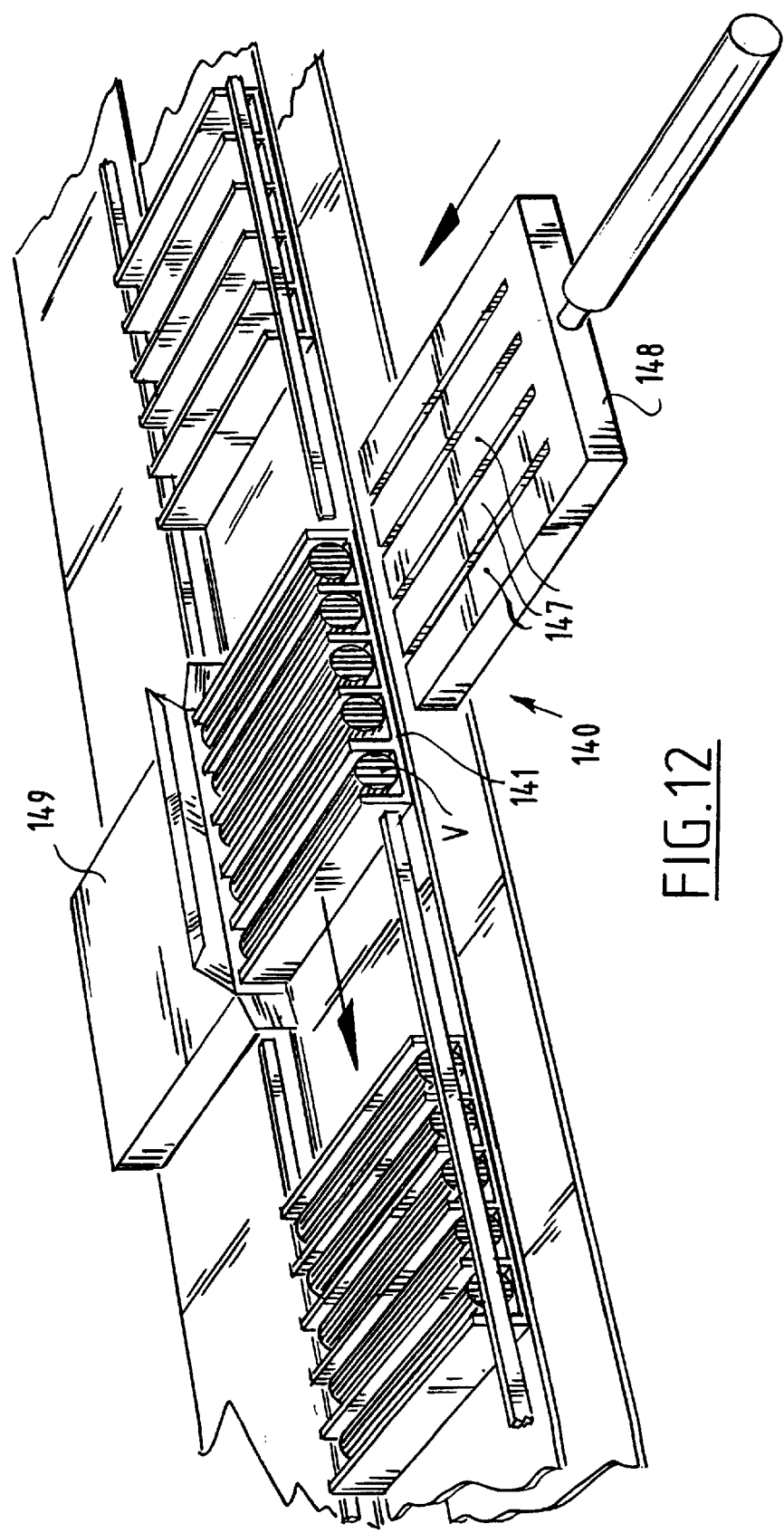
FIG. 12 shows a view in perspective of an outfeed station for use in the apparatus and method according to the present invention.

FIG. 12 shows a preferred embodiment of an outfeed station 140, wherein products V are pushed, using fingers 147 on a pushing member 148, out of a product carrier 141 into a box 149. A plurality of such pushing members 148 can be arranged adjacent each other.

Figure 13:
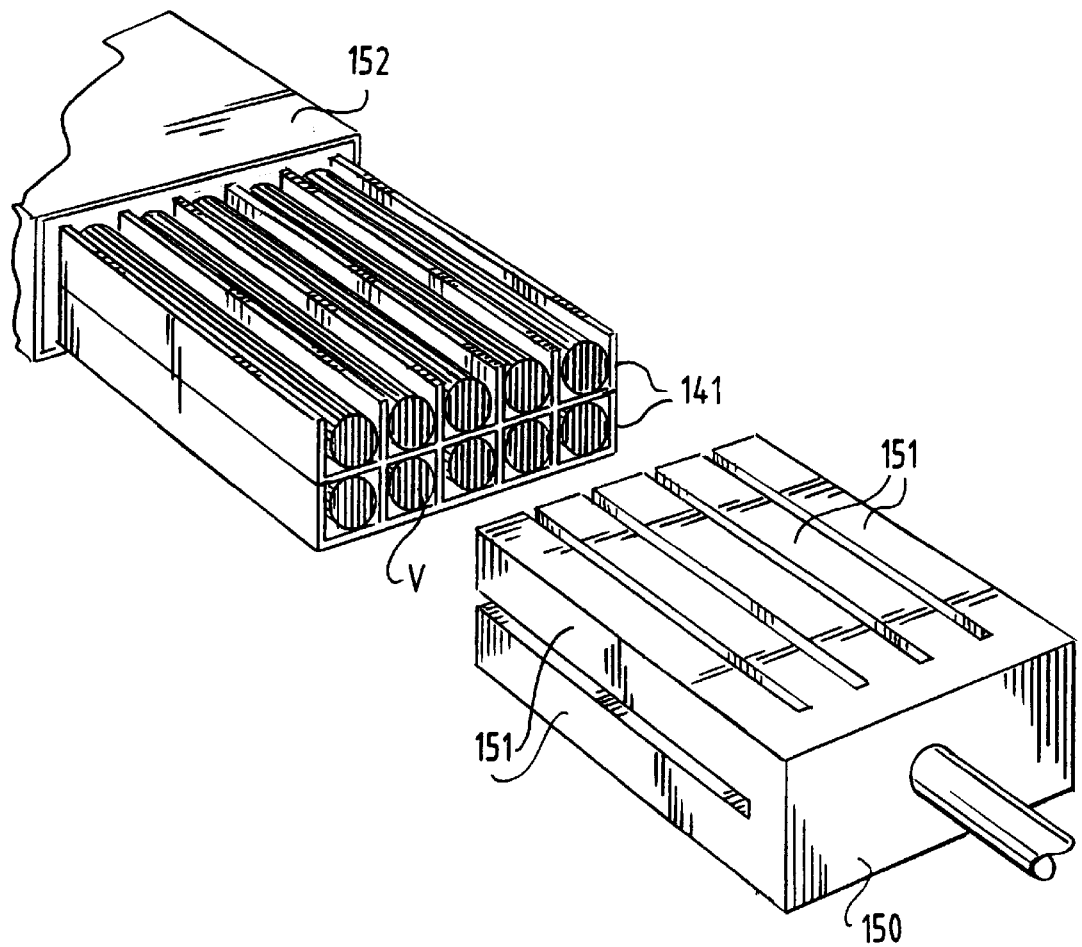
FIG. 13 is a perspective view of an alternative for use in the outfeed station according to FIG. 12.

In the alternative embodiment of FIG. 13 two product carriers 141 are arranged one above the other and a pushing member 150 is provided with fingers 151 arranged adjacent and above each other to slide products V into a box 152.

Figure 14:
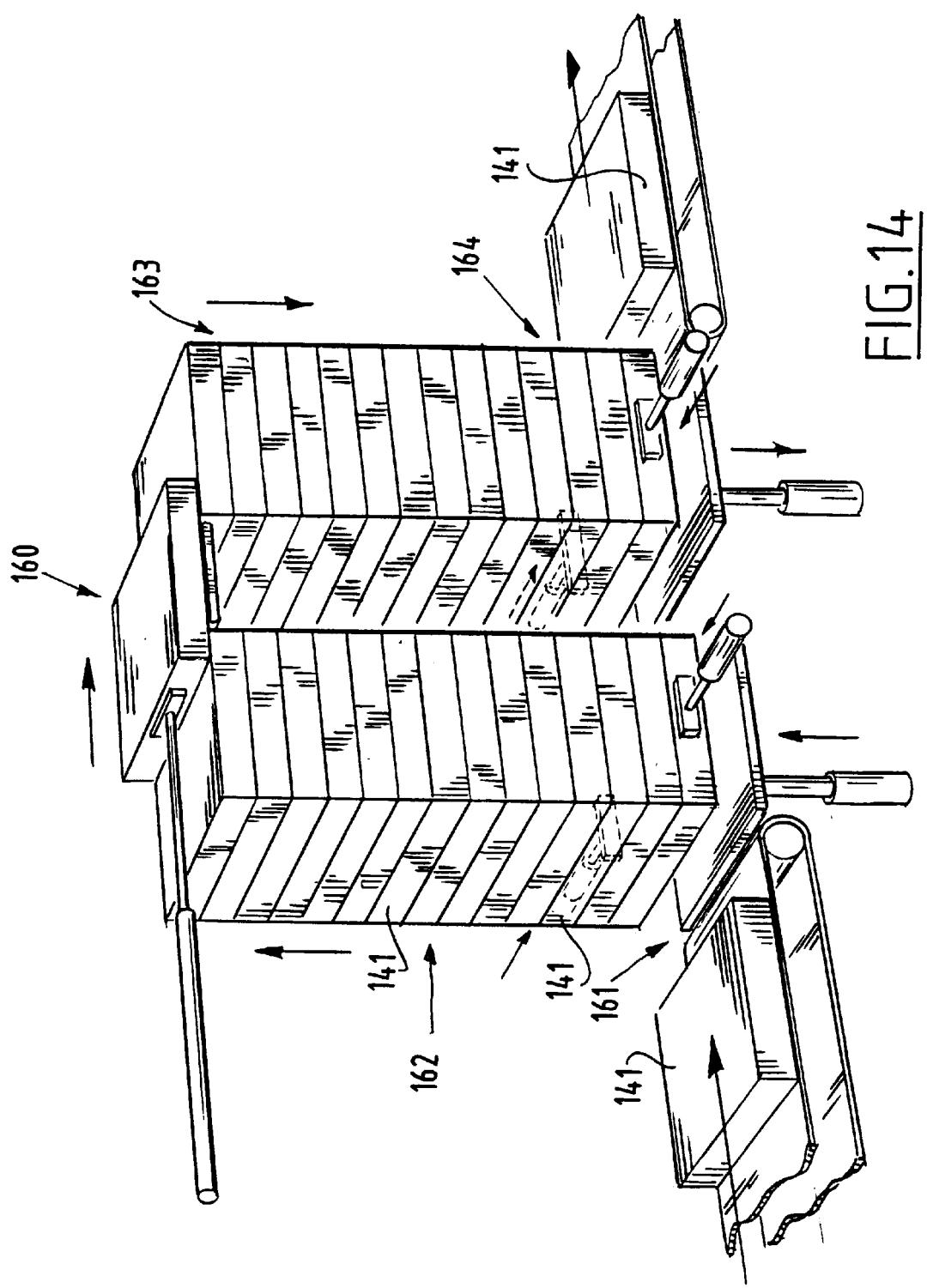
FIG. 14 is a perspective view of a method and apparatus applicable in the present invention for temporarily storing or buffering carrying means.

If the application of the apparatus according to the present invention gives cause thereto, the product carriers, such as 141 of FIG. 12 and 13, can be buffered in a buffer station 160 (FIG. 14). In the shown embodiment a product carrier 141 is fed into the input end 161 and added to the bottom of stack 162, while at the top an upper product carrier is added to a second stack 162.

Figure 15:
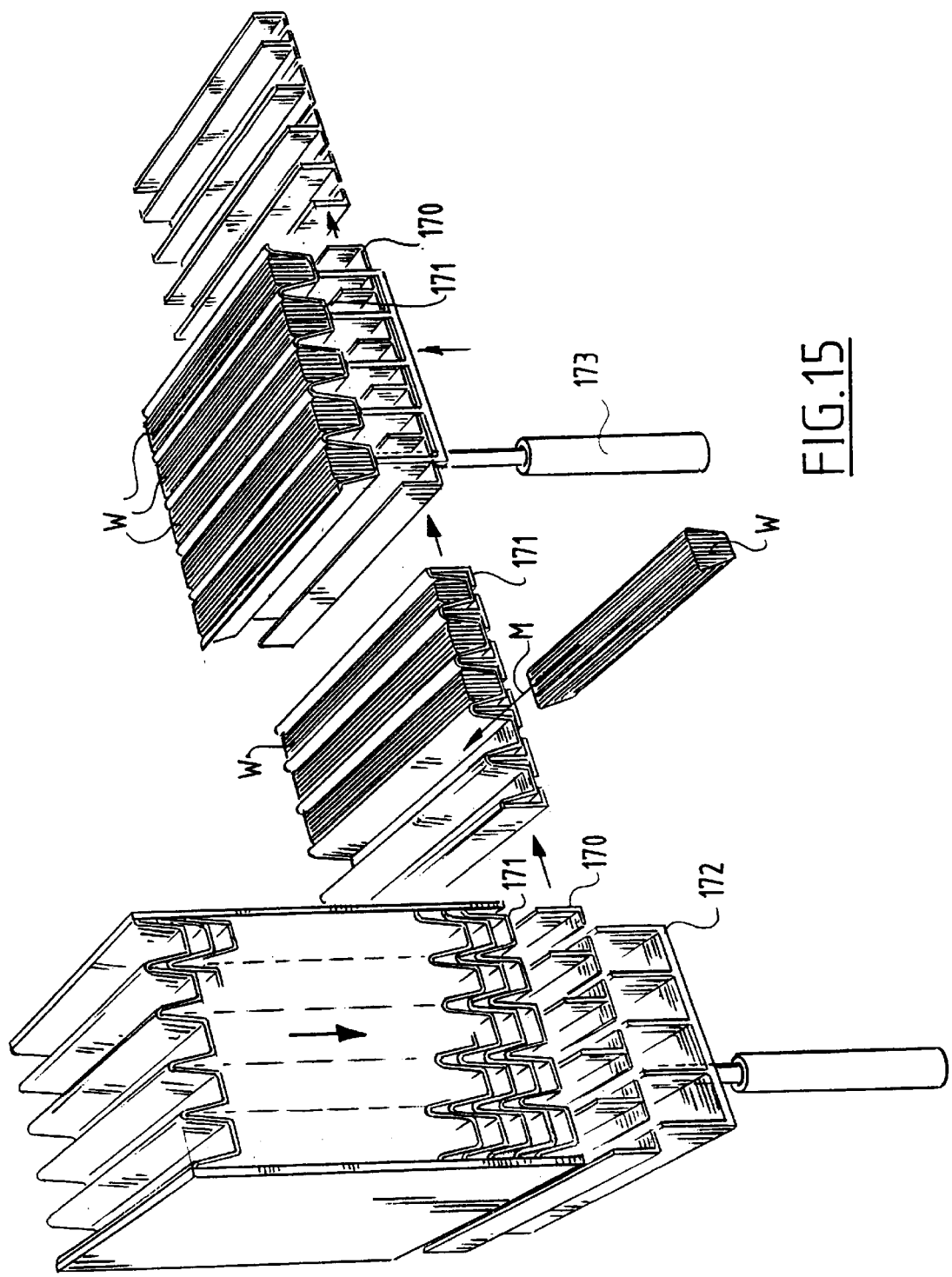
FIG. 15 is a perspective view of an infeed station for use in the apparatus according to the present invention.

On the outfeed side 164 the bottom product carrier 143 is discharged in each case, whereby a system of first-in-last-out results. It is equally conceivable to obtain a system of first-in-first-out with a different arrangement of stacks. In the embodiment, according to FIG. 15 a product carrier 170 is first filled with a packaging 171 which is placed in product carrier 170 by a placing member 172 provided with teeth. Products W are then placed in the direction of arrow M into the product carrier provided with a packaging 171. The packaging 171 with products W is subsequently pushed upward out of product carrier 170 by a press-out member 173.

In this preferred embodiment of the present invention products and packagings are simultaneously removed from the product carrier, which simplifies further operations.

Figure 16:
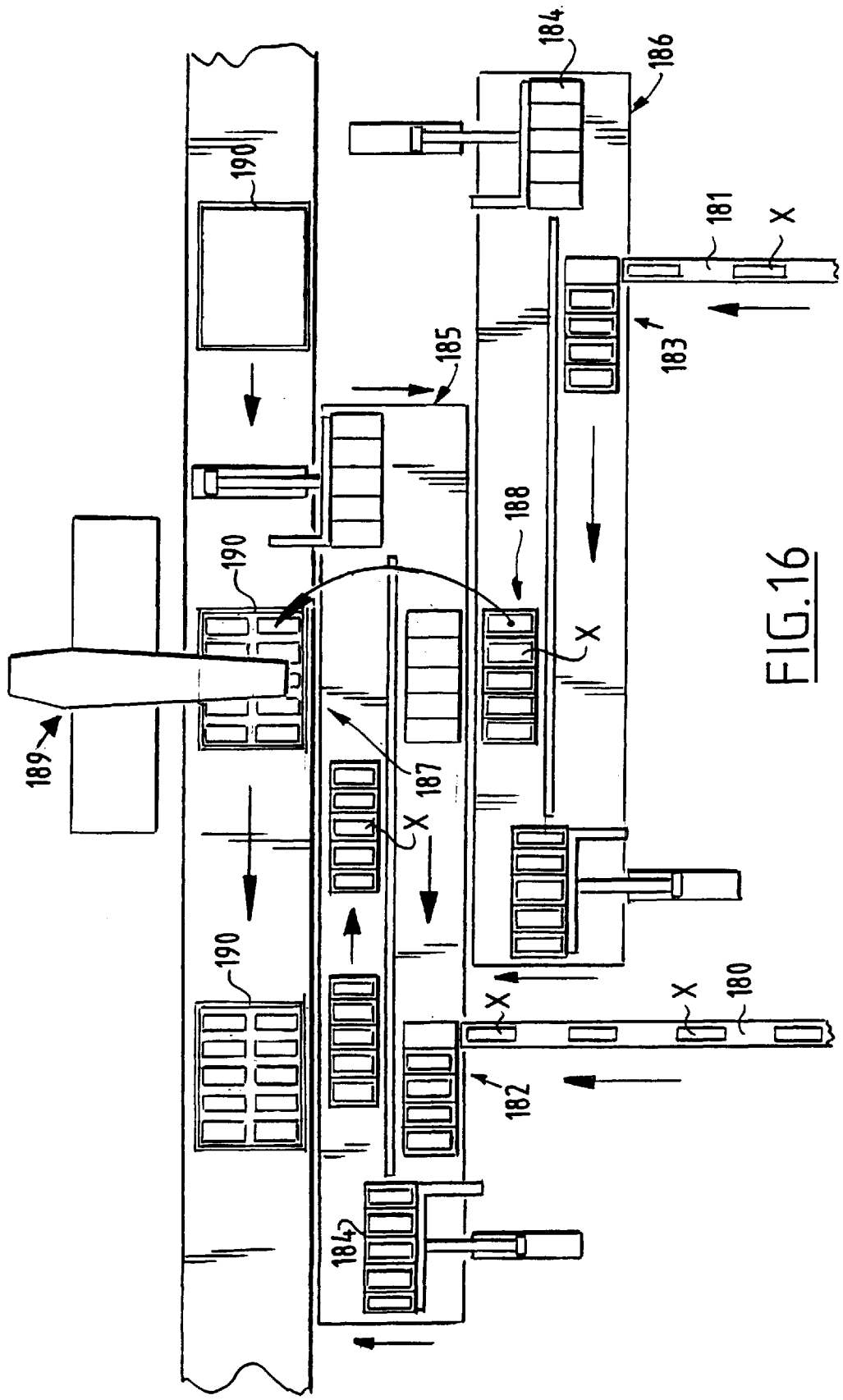
FIG. 16 shows a top view of an outfeed station for use in the apparatus according to the present invention.

In the arrangement according to FIG. 16 there are two feed conveyors 180, 181 for separate infeed stations 182, 183 for products X which are placed in a product carrier 184 on two main conveyor belts 185 respectively 186, wherein outfeed stations 187, 188 are positioned mutually adjacently so that a pick-and-place robot 189 can transfer products X out of the product carriers into boxes 190.

Figure 17:
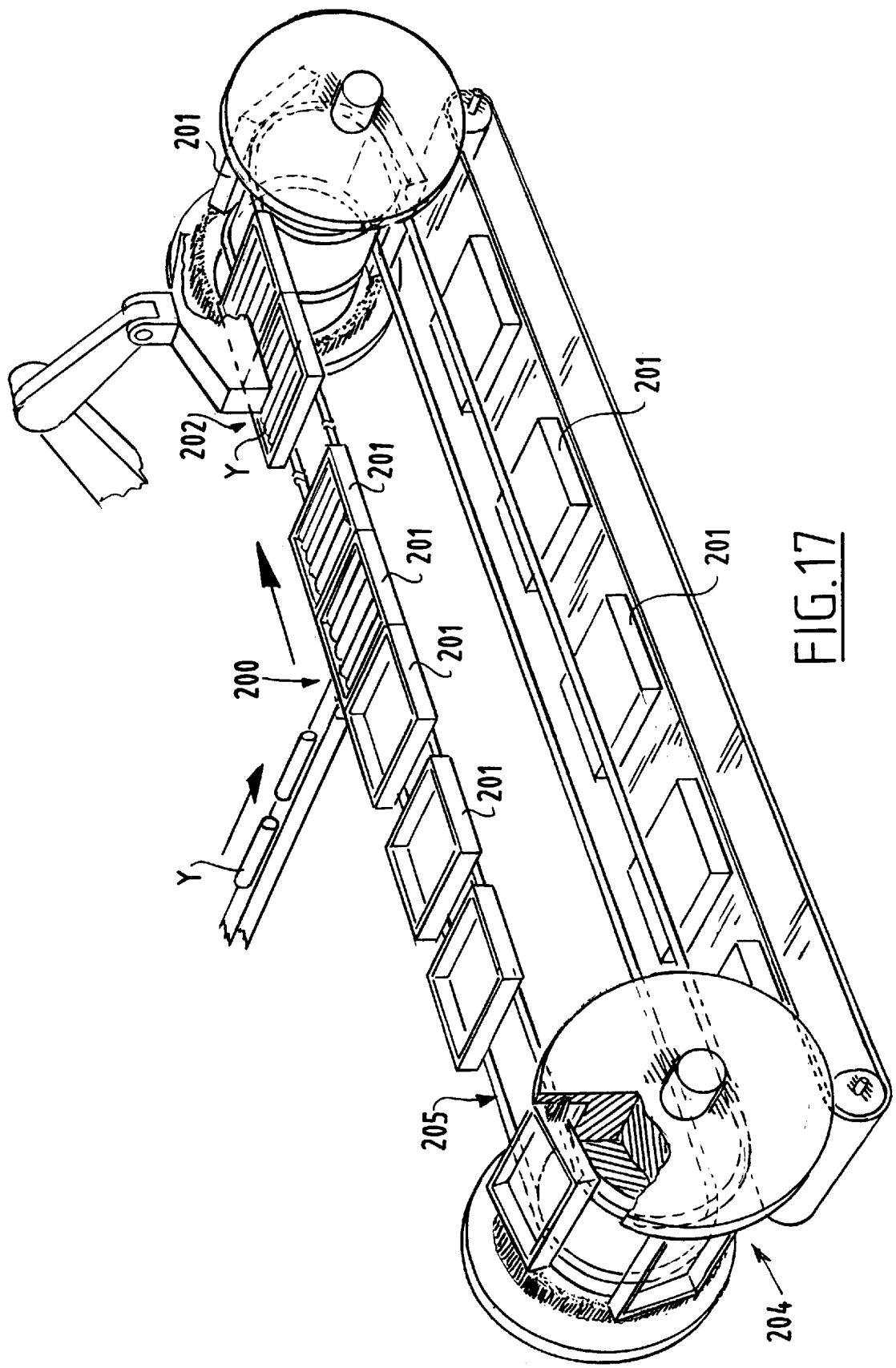
FIG. 17 shows a view in perspective of an alternative embodiment of the method and apparatus according to the present invention.

In the embodiment of FIG. 17 products Y are placed into product carriers 201 at infeed station 200 and products Y are removed by a robot arm 203 at outfeed station 202, whereafter product carriers 201 return to feed part 205 upside down along the underside of the transporting device 204. In this manner an extremely compact apparatus according to the present invention is obtained.

In FIG. 18 a product carrier 210 is shown in which products Z are arranged in a plurality of product carriers with products in a number of different directions, a so-called multiple product carrier, which can have advantages in particular applications.

Another embodiment of a multiple product carrier is shown in FIG. 19, in which products Z are placed in the same direction adjacent each other in a multiple product carrier 212 and can be discharged simultaneously into three boxes 214 using pushing members (for instance as in FIG. 12) which are not shown in FIG. 19.

Figure 20:
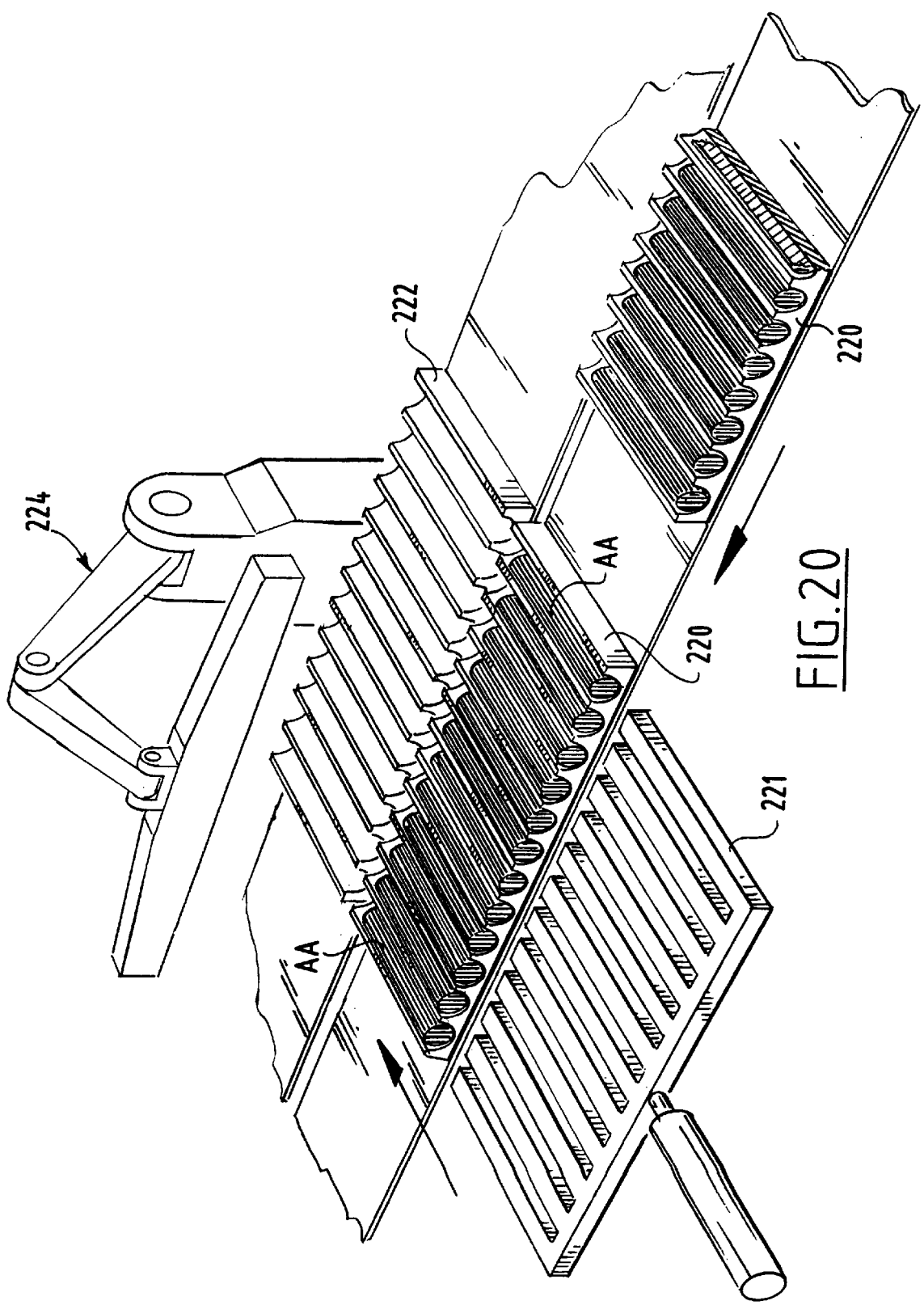
FIG. 20 shows a view in perspective of an outfeed station for use in the apparatus according to the present invention.

In the preferred embodiment according to FIG. 20 products AA are pushed out of product carrier 220 using a pushing member 221 and into a stationary product carrier 222 which is arranged in alignment with product carrier 220, so that the product carriers do not have to wait until a robot arm 224 has finished discharging products from a product carrier but a new product carrier 220 can be transported directly in front of pushing member 221.

Figure 21:
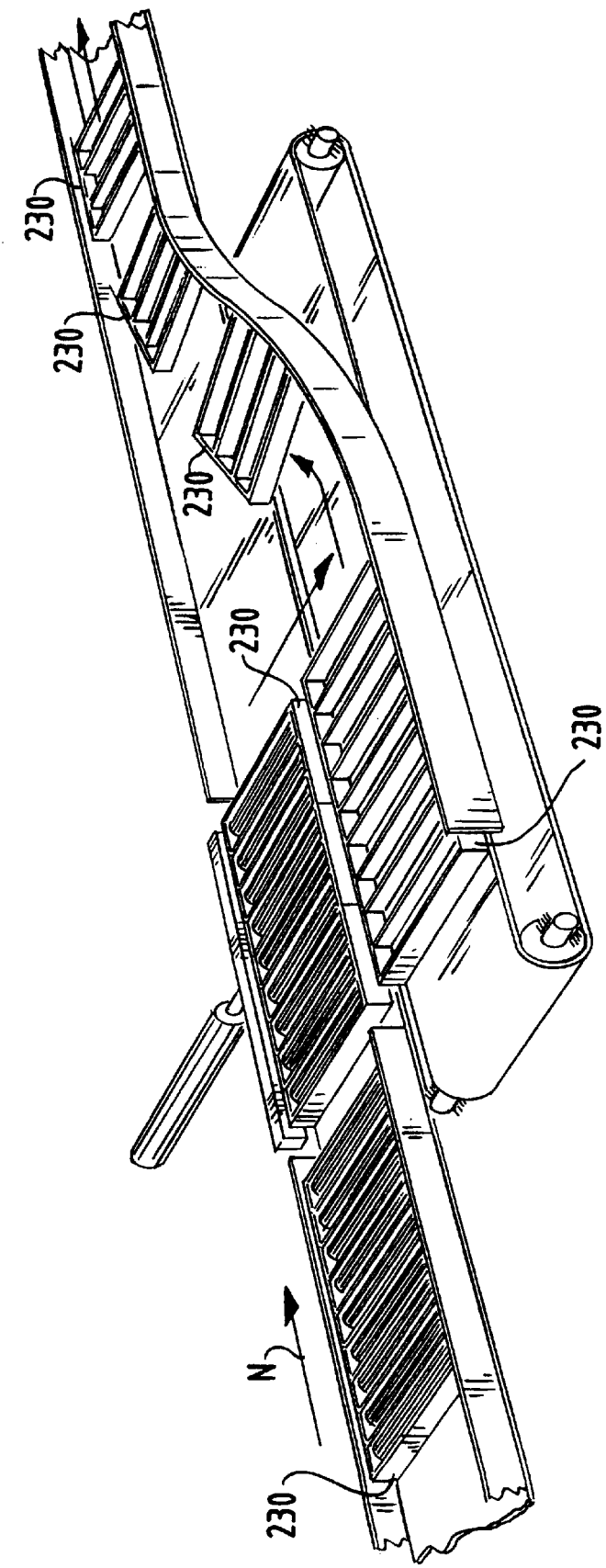
FIG. 21 is a perspective view of another outfeed station for use in the apparatus according to the present invention.

In the preferred arrangement of FIG. 21 product carriers 230 are supplied as according to arrow N and pressed by a pressing member 231 transversely of this main transporting direction N. wherein a robot arm which is not shown in FIG. 21 is capable of discharging the products from the product carriers in both positions in front of the pressing member 231.

Figure 22:
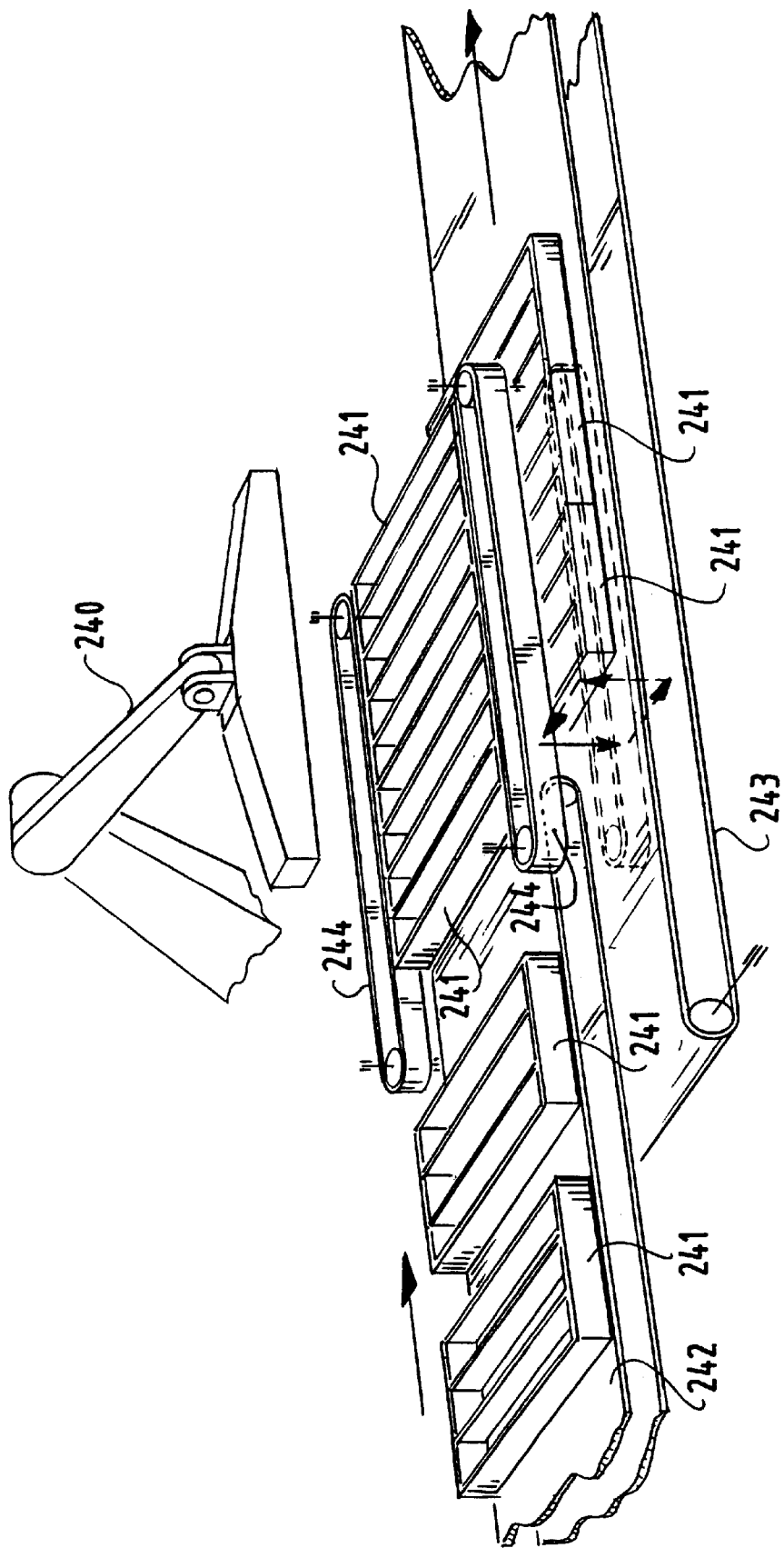
FIG. 22 is a perspective view of another outfeed station for use in the apparatus according to the present invention.

In the preferred embodiment of FIG. 22 a plurality of product carriers 241 is emptied using a robot arm 240, whereafter these product carriers can be discharged at a level under the supply belt 242 by a conveyor belt 243 to further accelerate discharge of the products. For this purpose the product carriers 241 are gripped at the sides by side belts 244 and clamped therebetween during discharge of the products, whereafter product carriers 241 are released by the side belts 244 and fall onto the lower conveyor belt 243 under the influence of the force of gravity.

Figure 23:
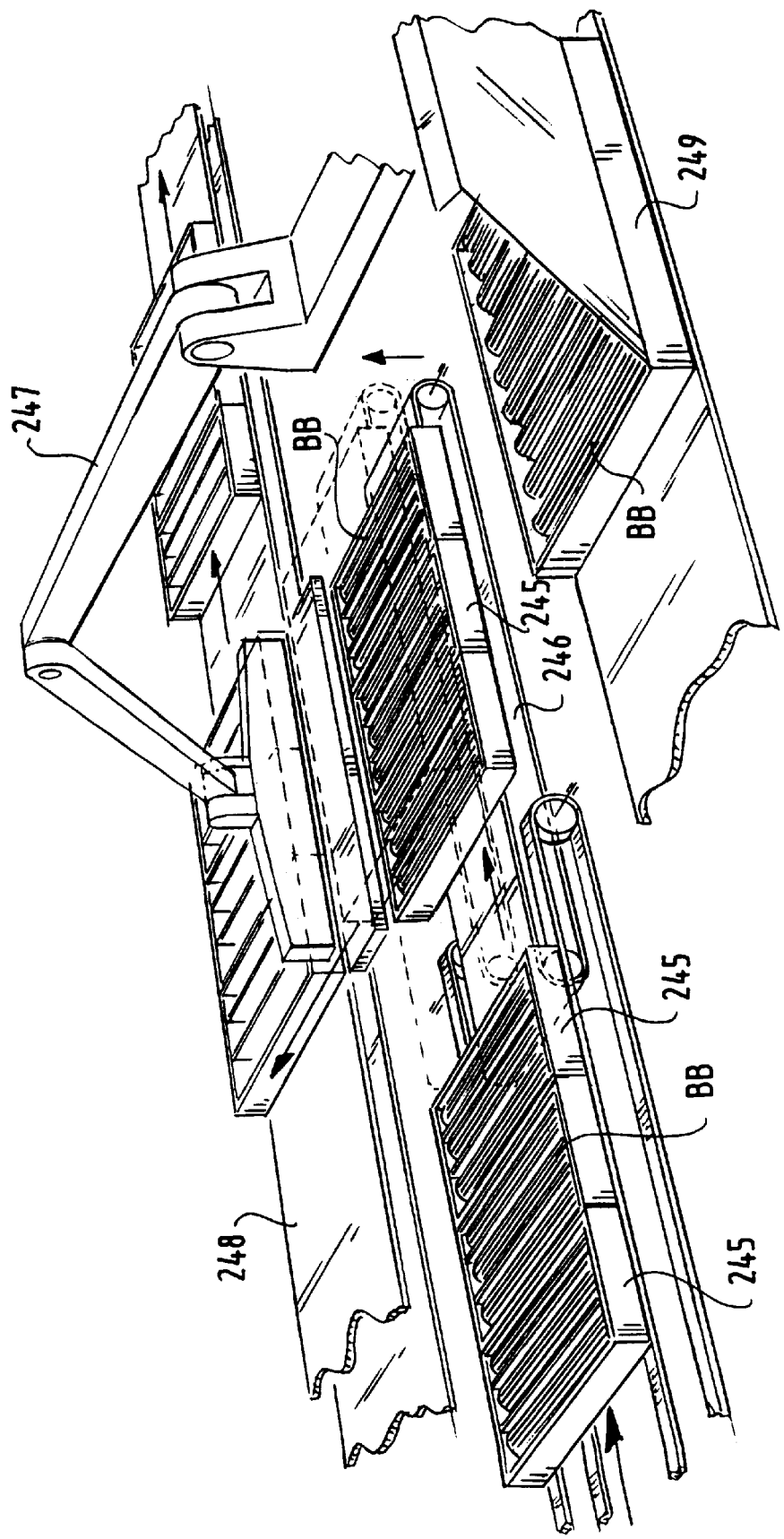
FIG. 23 shows a perspective view of an outfeed station for use in the apparatus and method according to the present invention.

In an arrangement as according to FIG. 23 full product carriers 245 are received by a conveyor 246 which moves up and downward, wherein the full product carriers 245 are first moved upward, then emptied using a robot arm 247 and subsequently further transported in empty state on a parallel conveyor belt 248. The products BB are discharged into a box 249. This preferred embodiment has the further advantage that while products BB are being transferred into the box 249 by robot arm 247, a number of full product carriers can already be standing ready thereunder.

Figure 24:
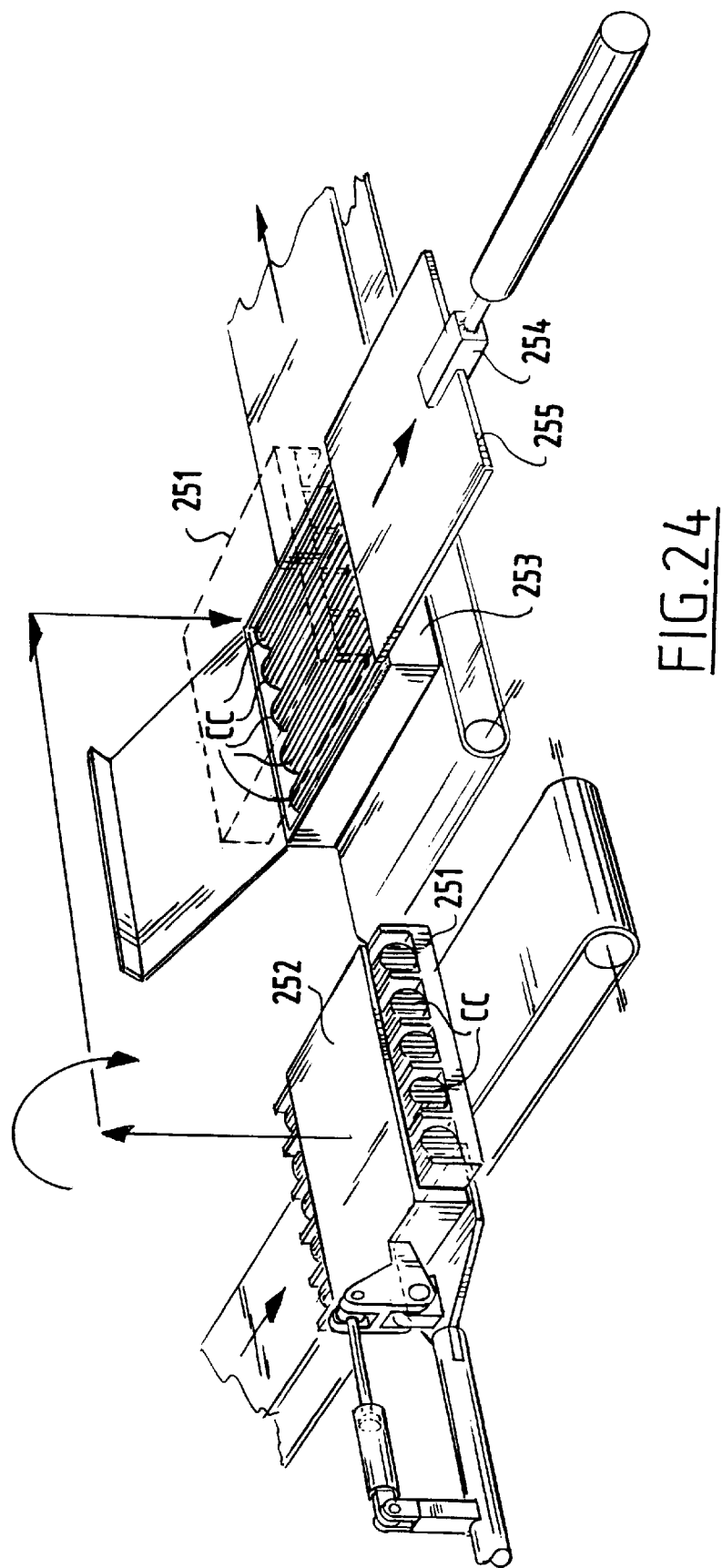
FIG. 24 shows a perspective view of means for carrying products for use in an apparatus according to the present invention.

The preferred embodiment of FIG. 24 relates to the situation wherein products CC in a product carrier 251 are turned over using a manipulator 252 and, in a turned-over position designated with dotted lines of product carrier 251 above a box 253, a plate 255 above box 253 is subsequently pulled away by means of a further manipulator 254, whereafter products CC drop into the box 253.

In a preferred embodiment of a product carrier 260 (FIG. 25) this latter is constructed from basic elements 261 which can slide into each other using a dovetail joint to form a product carrier of desired size. Using the separate connecting element 271, according to FIG. 26, both side walls of two successive product carriers, which may be manufactured from extruded aluminium or plastic material, can take an identical form, thus further facilitating the manufacture.

In the preferred embodiment of a product carrying element 280, according to FIG. 27, with closed end faces 281, 282 there is a bin-like form, which is preferably obtained using injection moulding techniques for injection moulding such an element 280, from plastic. In the product carrier 290 of FIG. 28 there is an outer bin 291 in which, depending on the product for handling, a separate inner part 292 can be placed which is exchangeable and which can thus be easily adapted to the dimensions of a product.

Figure 29:
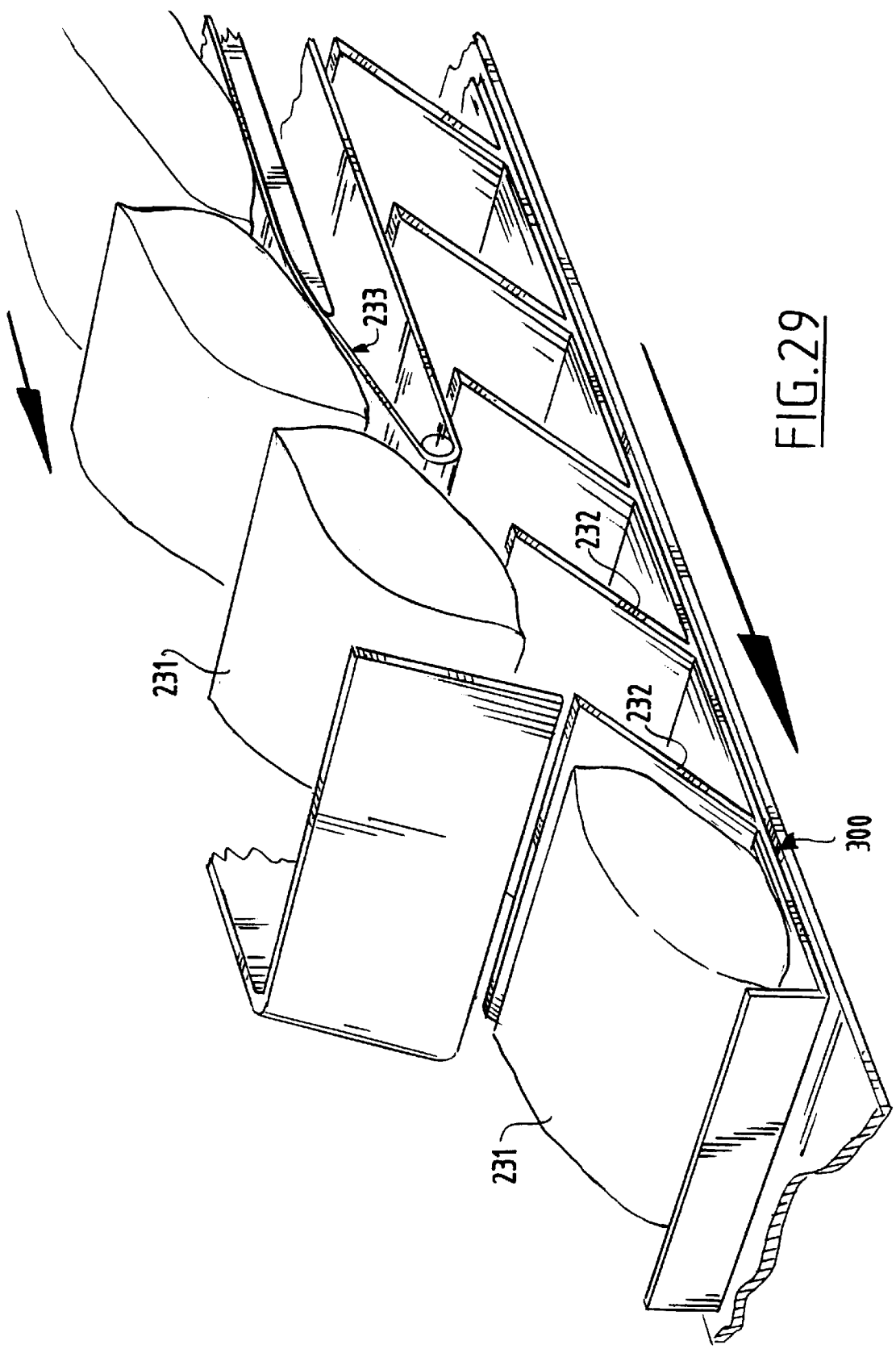
FIG. 29 shows a view in perspective of a further preferred embodiment of product carrying elements according to the present invention.

A product carrier 300, according to FIG. 29, is particularly suitable for products 231 in a flexible packaging such as bags and comprises upward inclining wall parts 232 between which the packagings 233 can be introduced using a downward sloping outfeed conveyor 233.

Figure 30:
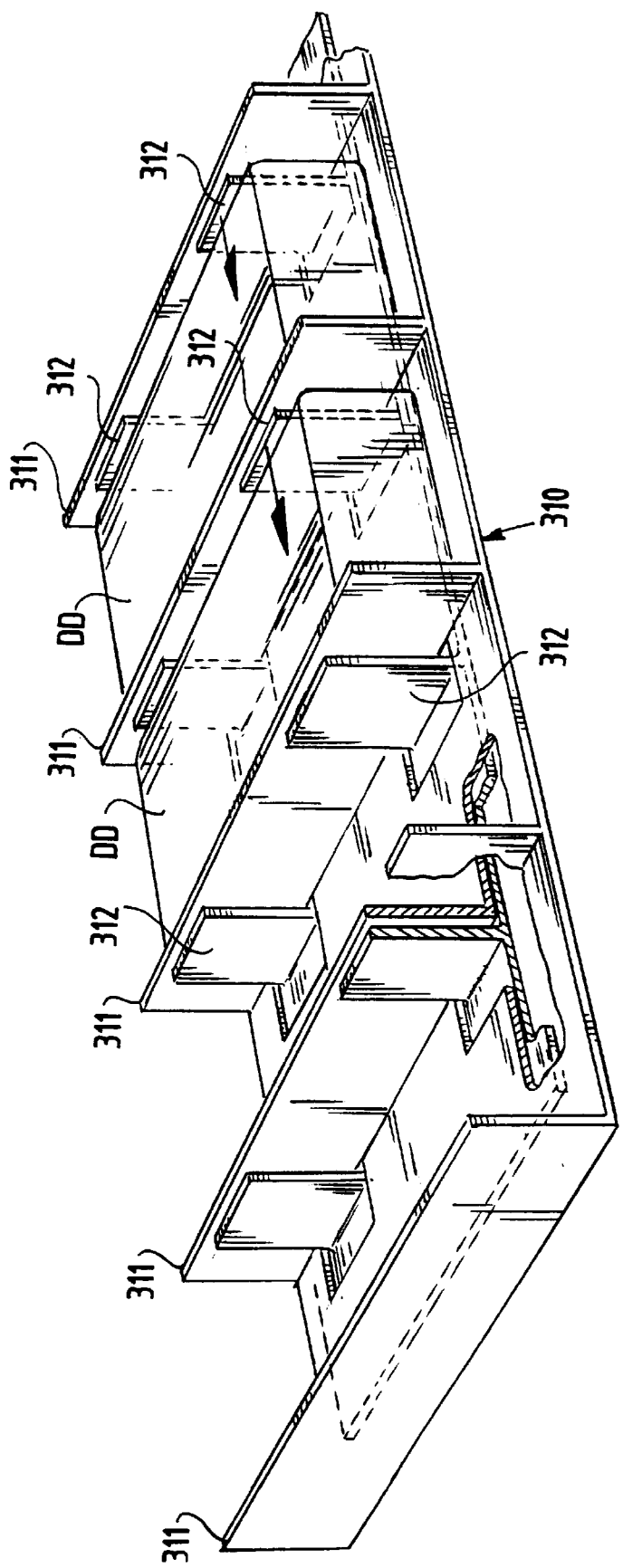
FIG. 30 shows a perspective view of a further preferred embodiment of a product carrying device for use in an apparatus and method according to the present invention.
Figure 31:
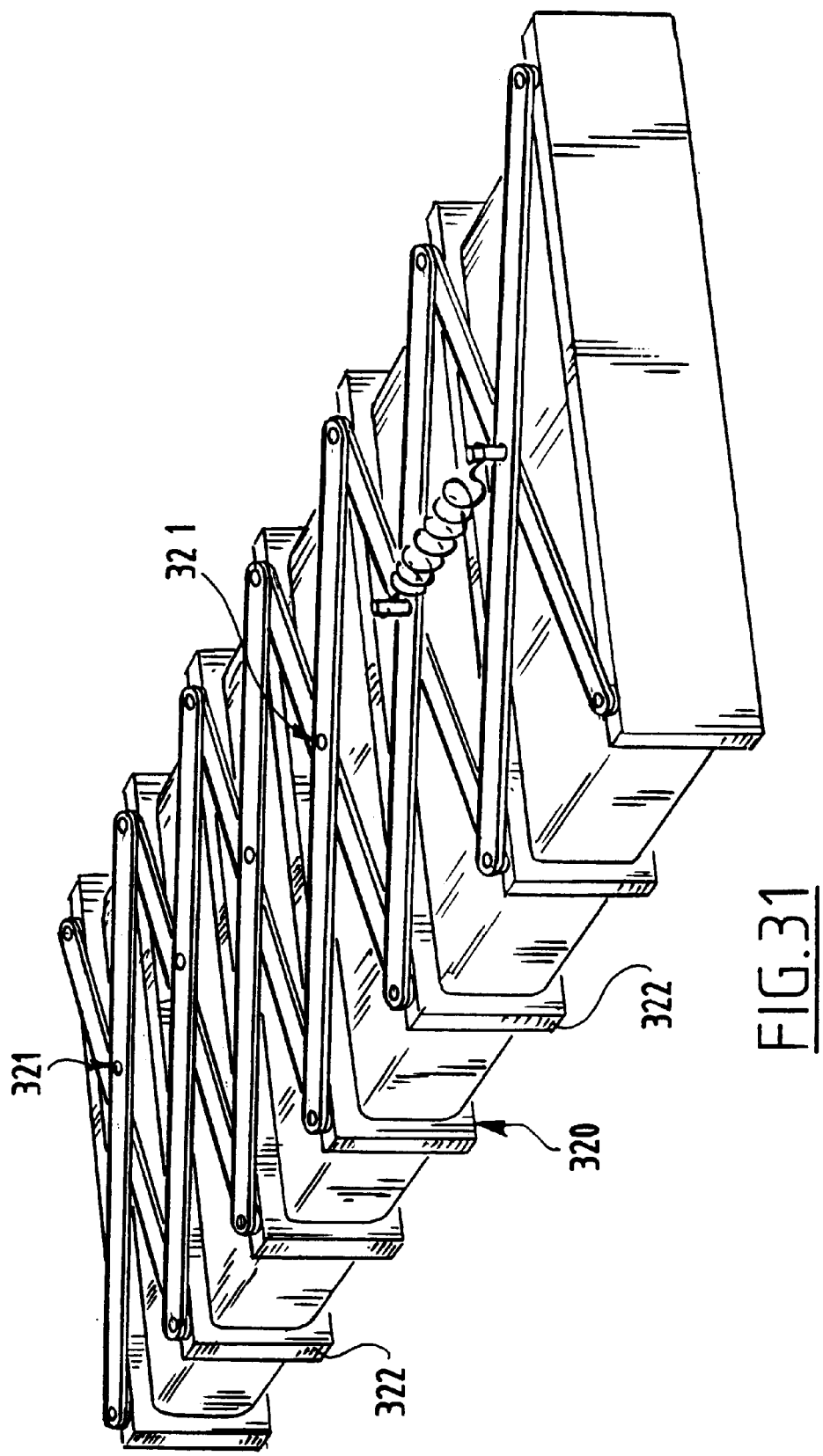
FIG. 31 shows a perspective view of an application of a product carrying element.

Using the product carriers 310 and 320 (FIGS. 30 and 31) products DD can be clamped between standing wall parts 311 using resilient lips 312, which is also of importance for particular forms of packaging. This clamping is achieved according to FIG. 31, by using link connections 321 between successive side walls 322 of product carrier 320.

Figure 32:
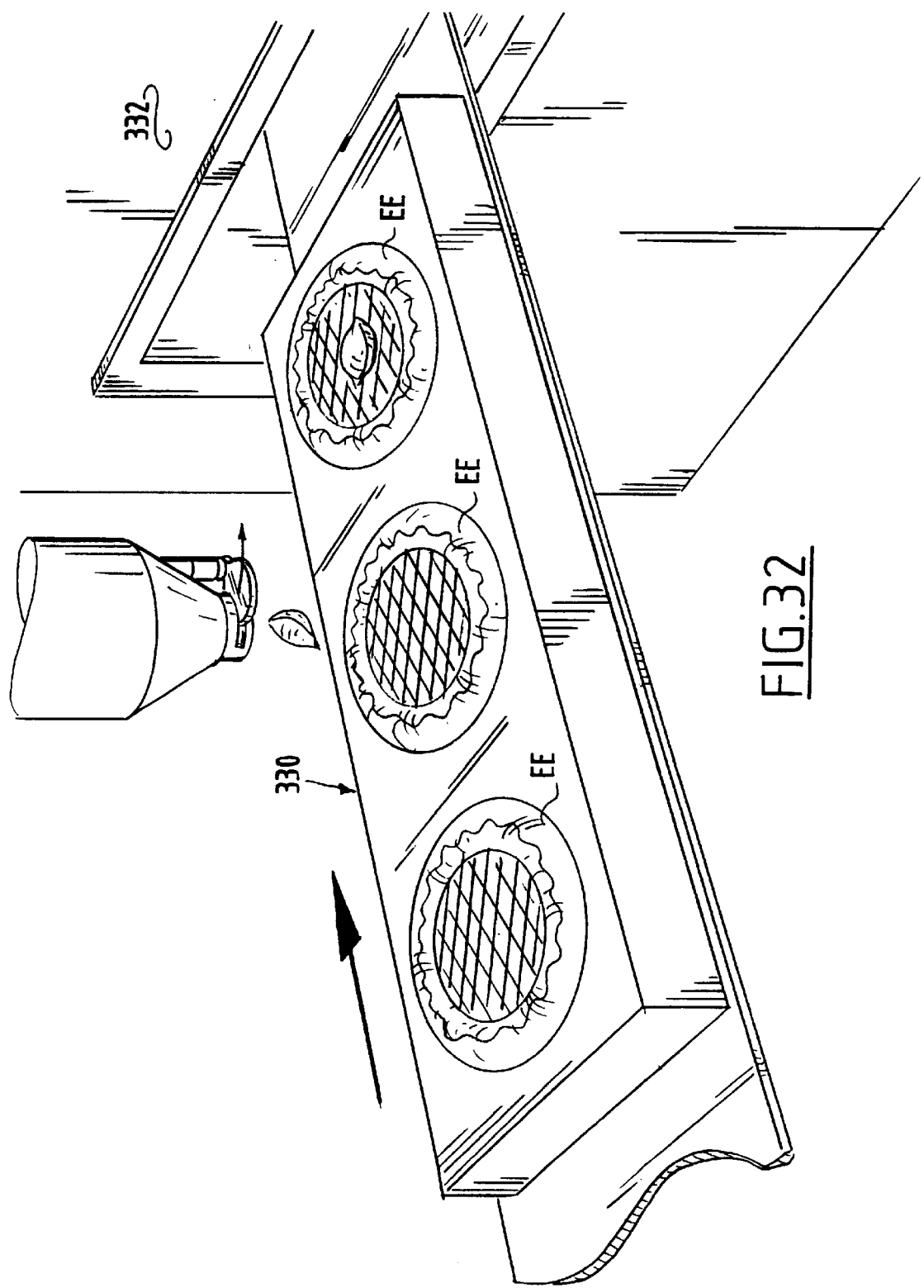
FIG. 32 is a view in perspective of a plurality of coupled product carrying elements.

In the embodiment of FIG. 32, a product carrier 330 is used in a process for realizing a product EE, for instance cake, prior to the baking process in an oven 332. It is equally conceivable to have assembly of products and product carriers and packaging of an assembled product from a product carrier take place consecutively.

Figure 33:
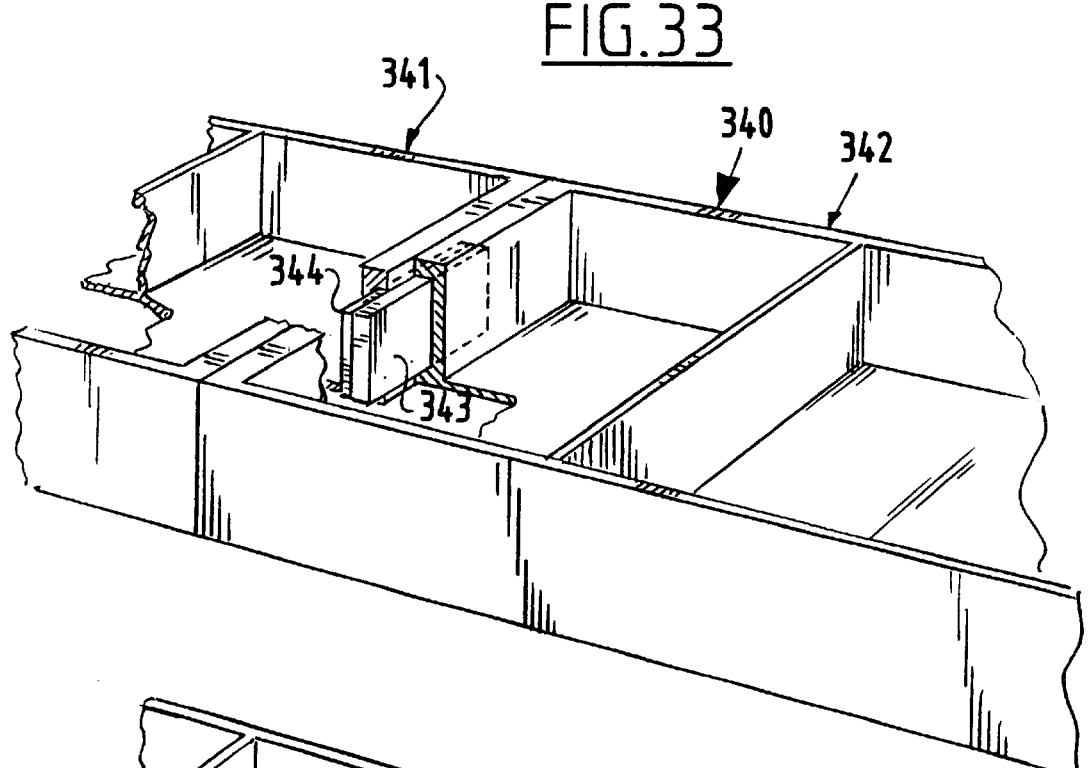
FIG. 33 is a view in perspective of product carrying elements coupled in alternative manner.

In the product carrier 340, according to FIG. 33, two product carrying elements 341, 342 are mutually connectable using a permanent magnet 343 and a metal plate 344, whereby a seamless connection takes place with sufficient adhesive force, while the product carrying elements 341 and 342 can be pulled apart if desired.

Figure 34:
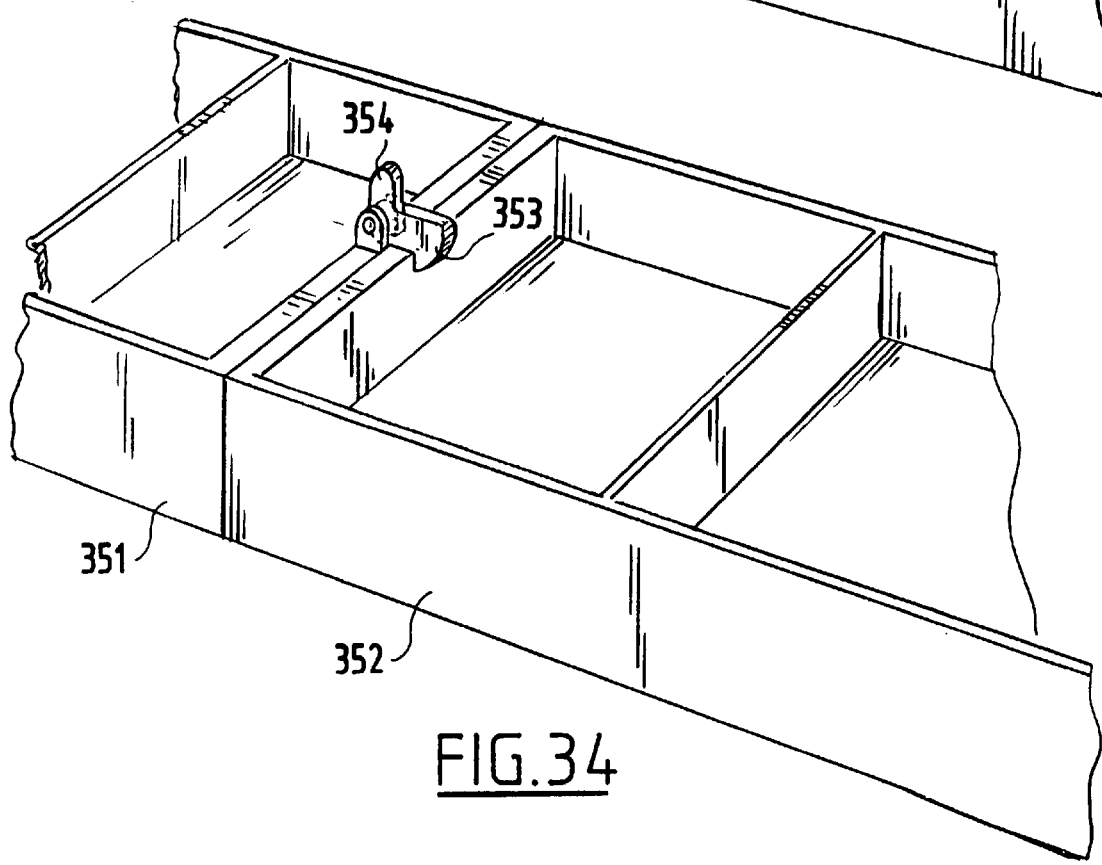
FIG. 34 shows a view in perspective of another preferred embodiment of mutually coupled product carrying elements.

In the embodiment of FIG. 34, two product carrying elements 351 and 352 are mutually connected for the same purpose using a ratchet element 354 which is provided with a hook element 353 and which can be actuated using a cam (not shown) on an embodiment of the apparatus according to the present invention.

Figure 35:
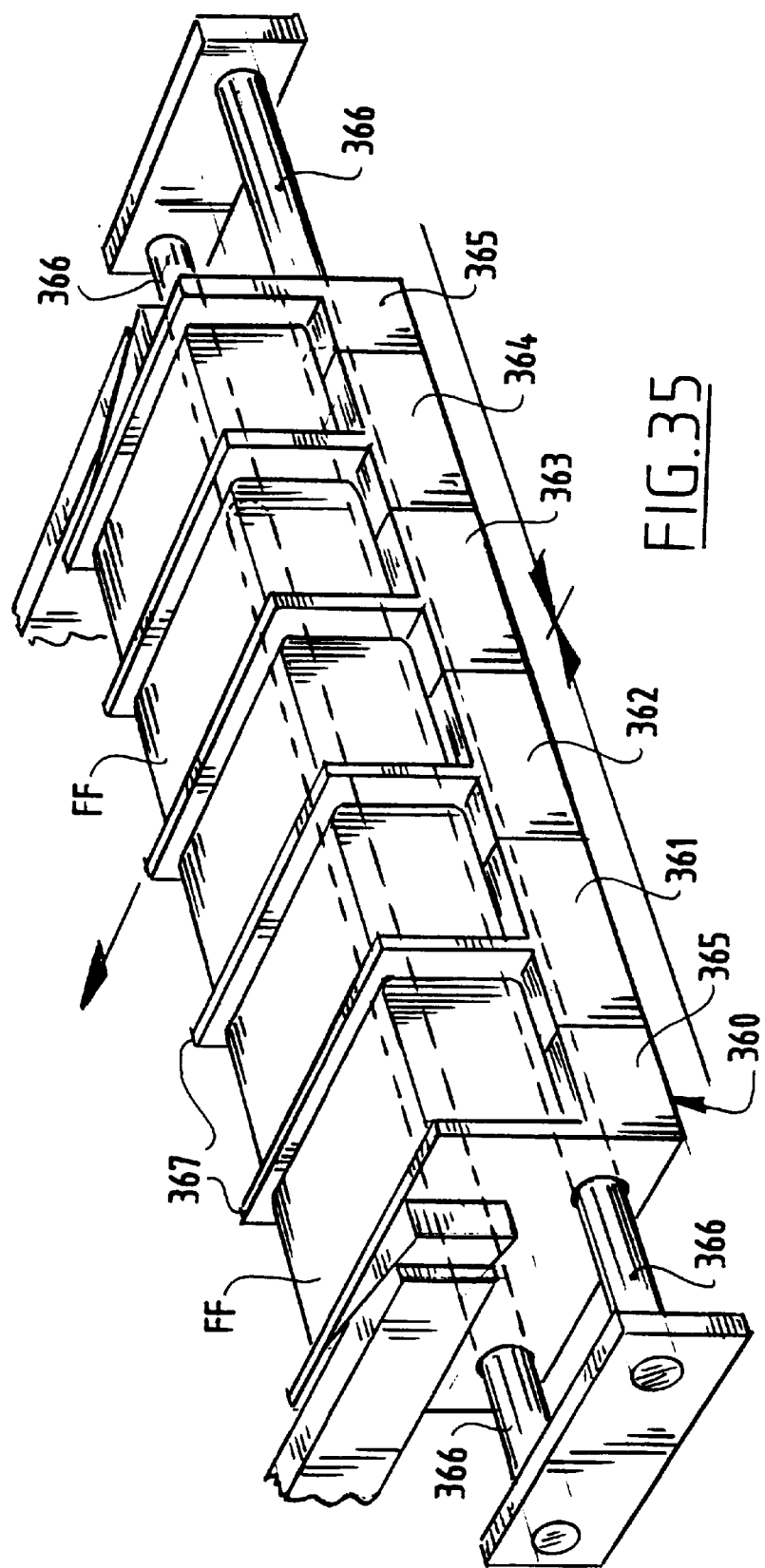
FIG. 35 shows a view in perspective of the apparatus of FIG. 34 in the product releasing position.
Figure 36:
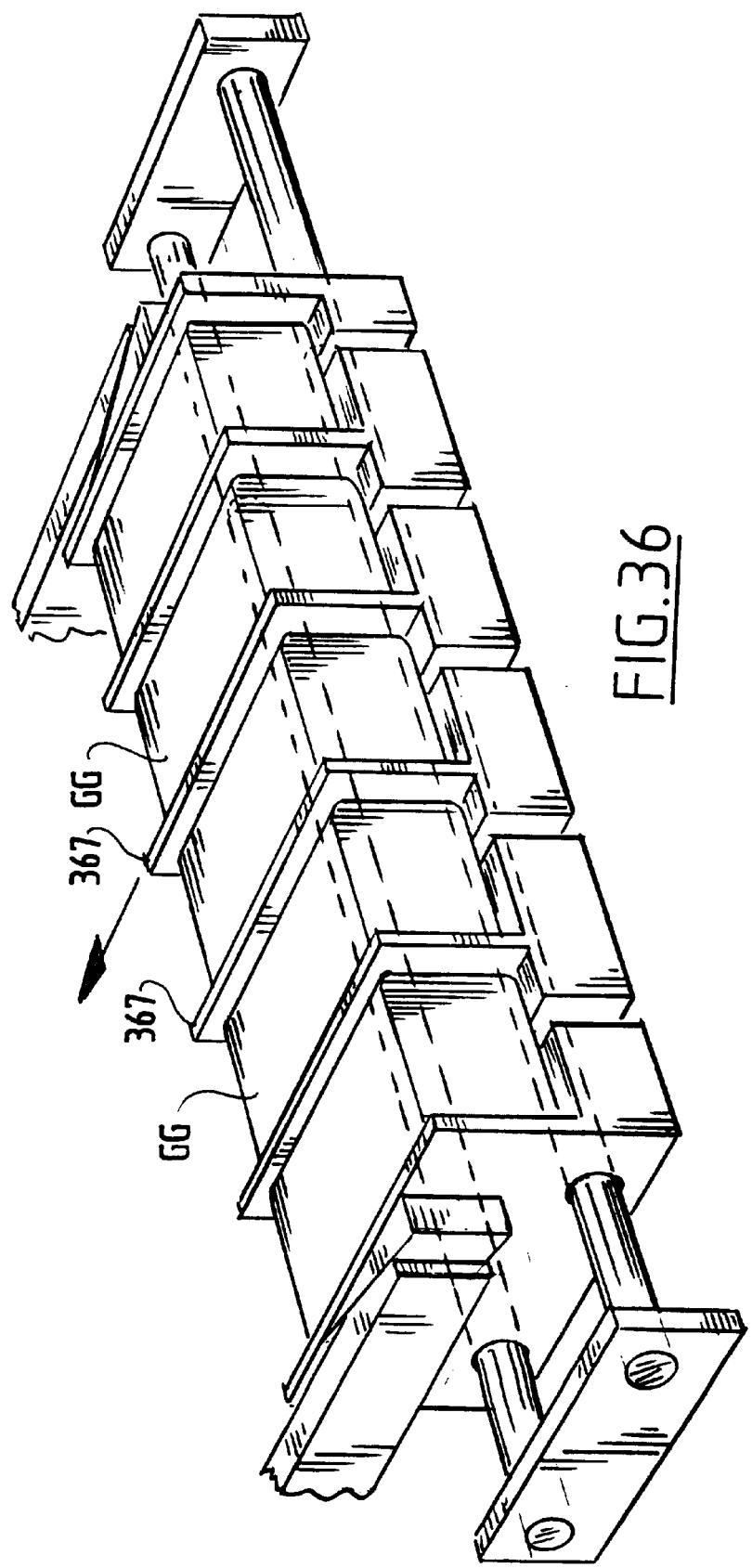
FIG. 36 shows a perspective view of the apparatus of FIG. 34 and 35 in an alternative embodiment.
Figure 37:
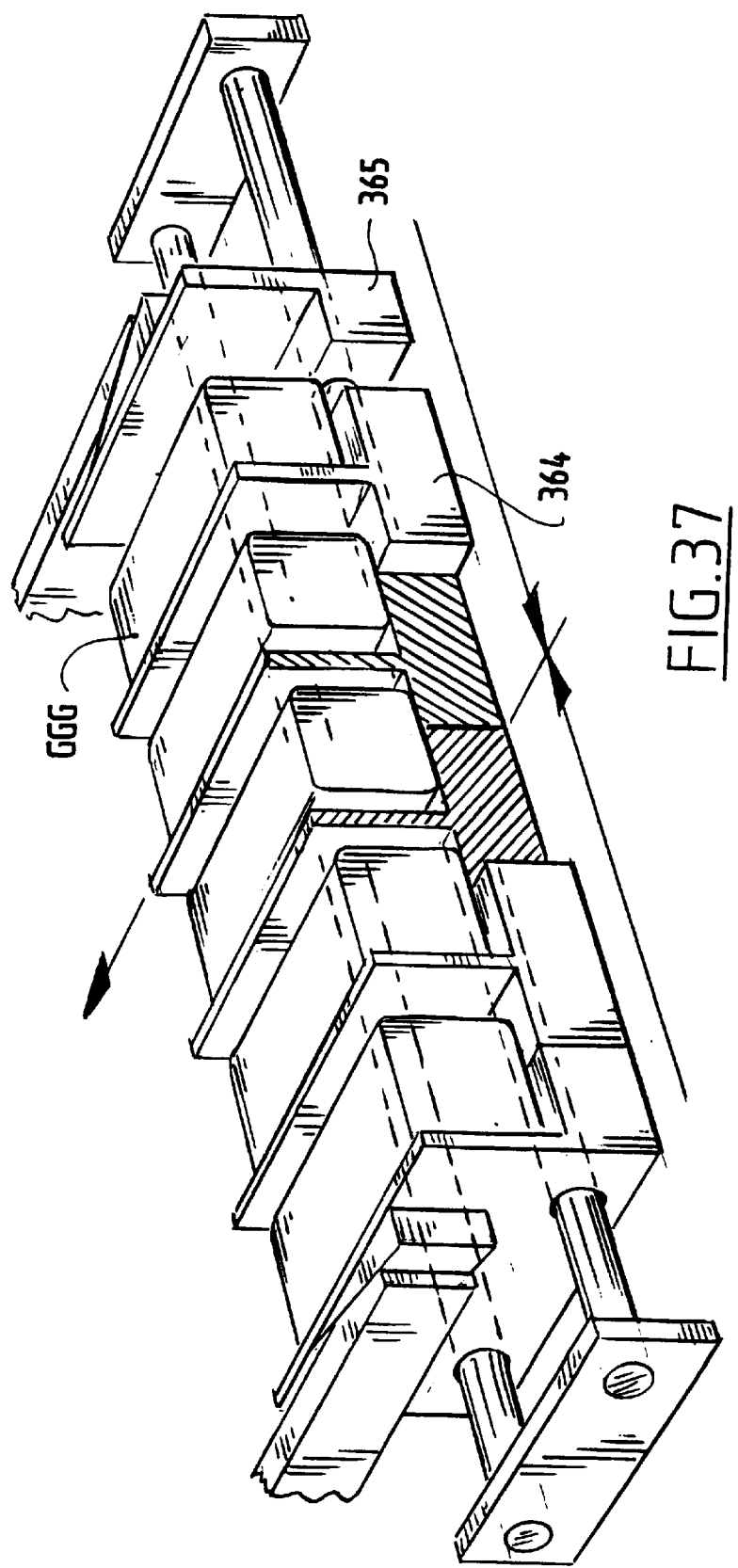
FIG. 37 shows a perspective view of an alternative embodiment of a product carrying element according to the present invention.

In the product carrier 360 of FIG. 35 separate elements 361, 362, 363, 364, 365 can be moved apart along guide rods 366, for instance to the opened position shown in FIG. 36, wherein insertion of products GG can take place more easily. It is likewise possible to open only one product position, for instance the one furthest to the right between elements 365 and 364, for insertion of the relevant GGG (FIG. 37).

Figure 38:
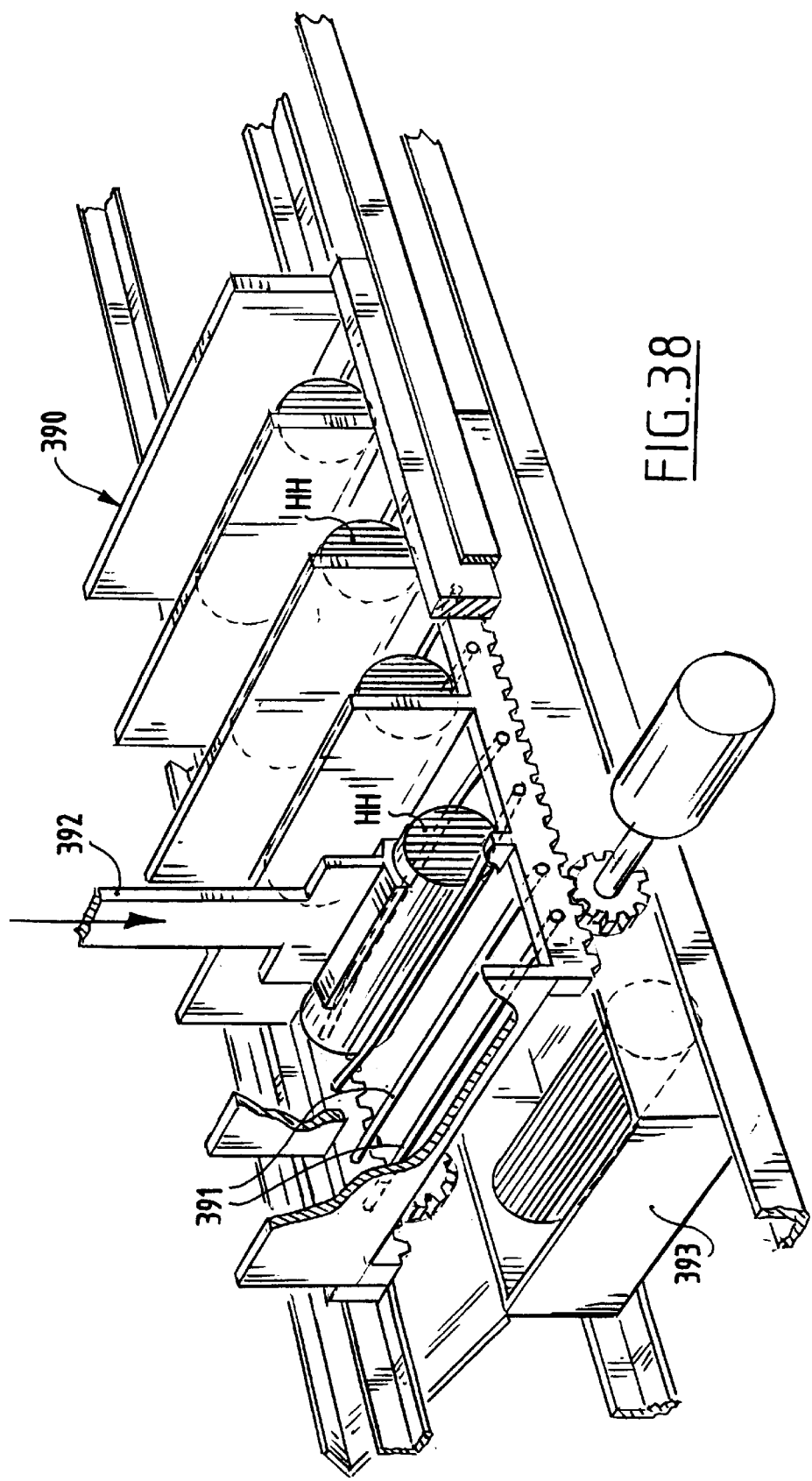
FIGS. 38 and 39 show perspective views of further preferred embodiment of a product carrying element according to the present invention.
Figure 39:
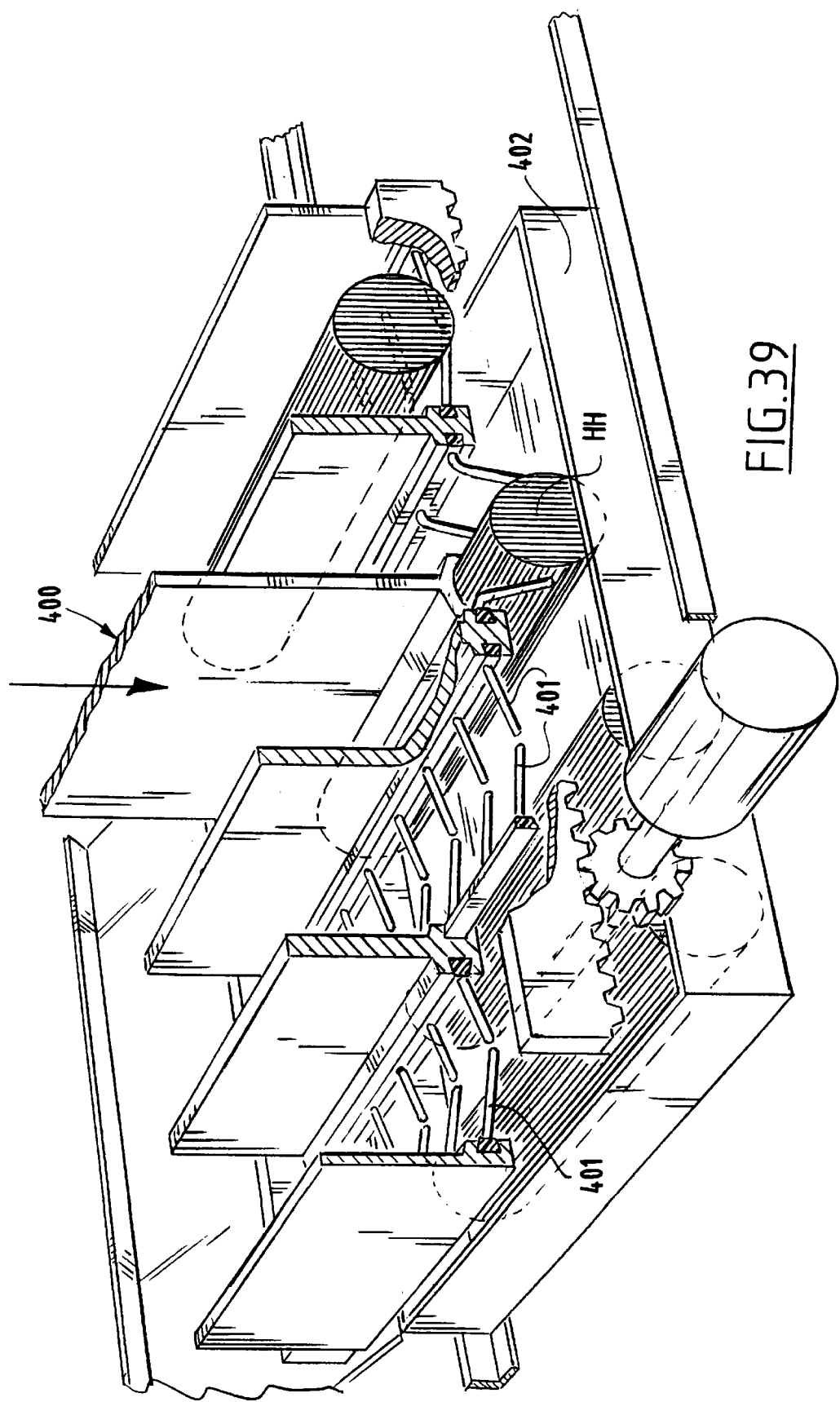

A further preferred embodiment relates to a product carrier 390 as shown in FIG. 38, wherein the bottom is formed by at least partly elastic cords 391, so that using a press-through member 392 a product HH can be pressed through the bottom into a packaging box 393, such as croquettes. An alternative preferred embodiment relates to a product carrier 400 as according to FIG. 39, wherein the bottom is formed by pins 401 extending halfway which are manufactured for instance from polyurethane or silicone rubber and through which the products HH can be pressed into a packaging box 402.

What is claimed is:

1. An apparatus for temporary storing or buffering and/or setting the pitch of products, and carrying means for carrying a number of products, said apparatus comprising:

a mechanical infeed means for feeding products into the carrying means at relatively high speed;

a conveyor track or belt, for conveying the carrier means at relatively low speed;

outfeed means for discharging products from the carrying means at relatively high speed;

the carrying means are accelerated in synchronization with the infeed and outfeed means respectively, so as to adapt to the relatively high speed thereof;

said carrying means are decelerated to adapt to the relatively low speed of the conveyor track; and said carrying means comprising one or more product carriers for carrying two or more products, said product carriers being movable independently to and from the conveyor and being loaded and unloaded with products at the infeed and outfeed locations respectively, the transport of said product carriers at said outfeed and said infeed locations being substantially independent of the movement of the conveyor track or belt, wherein the infeed means and outfeed means are arranged at respective infeed and outfeed locations of the transport track.

2. The apparatus according to claim 1, wherein the carrying means comprises one or more product carriers to receive two or more products adjacent to each other.

3. The apparatus according to claim 2, wherein each product carrier is provided with a tooth rack onto which a pinion being part of the infeed means engages.

4. The apparatus according to claim 2, wherein the infeed means are provided with suction means to hold the product carrier onto a conveyor.

5. The apparatus according to claim 2, wherein the infeed and/or outfeed means are formed by a top loader or a robot provided with one or more gripping members.

6. The apparatus according to claim 5, wherein two outfeed locations situated adjacent to each other are arranged underneath the toploader.

7. The apparatus according to claim 1, wherein said product carrier is built from carrier elements of substantially the same shape.

8. The apparatus according to claim 1, wherein a product carrier comprises parts movable towards and from each other to engage a product to a greater or lesser degree.

9. The apparatus according to claim 8, further comprising a connecting means between the carriers, said connecting means comprising a magnet and a sheet of magnetizable material.

10. The apparatus according to claim 1, wherein the product carrier is provided with a bottom through which products are pushable.

11. The apparatus as claimed in claim 2, wherein the product carrier is constructed from substantially identical carrier elements.

12. The apparatus as claimed in claim 1, wherein a product carrier comprises one or more partition parts extending at an angle relative to a bottom of the product carrier.

13. The apparatus as claimed in claim 1, wherein a product carrier comprises parts movable toward and away from each other for gripping a product to a greater or lesser extent.

14. The apparatus as claimed in claim 1, further comprising connecting means for connecting two product carriers.

15. The apparatus as claimed in claim 14, wherein the connecting means between the product carriers comprises a magnet and a plate of magnetizable material.

16. The apparatus as claimed in claim 1, wherein a product carrier is provided with a bottom through which products can be pressed.

17. A method for temporarily storing, buffering and/or setting the pitch of products, comprising the following steps:

provid ing an apparatus for temporarily storing or buffering and/or setting the pitch of products and carrying means for carrying a number of products, said apparatus having a mechanical infeed means for feeding products into the carrying means at relatively high speed, a conveyor track or belt for conveying the carrier means at relatively low speed and an outfeed means for discharging products from the carrying means at relatively high speed;

mechanically feeding products into said carrying means at a predetermined location of said conveyor track;

conveying the products in the carrying means to a predetermined outfeed location at the conveyor track thereby; and mechanically outfeeding the products from the carrying means at the outfeed location.

18. A method for temporarily storing or buffering and/or setting the pitch of products, comprising the following steps of:

providing an apparatus for temporarily storing or buffering and/or setting the pitch of products and carrying means for carrying a number of products, said apparatus having a mechanical infeed means for feeding products into the carrying means at relatively high speed, a conveyor track or belt for conveying the carrier means at relatively low speed and a mechanical outfeed means for discharging products from the carrying means at relatively high speed;

feeding products into said carrying means at a predetermined location of said conveyor belt with said mechanical infeed means;

transporting and buffering the products in the carrying means, using the conveyor belt, to a predetermined outfeed location on the conveyor belt; and discharging the products from the carrying means with said mechanical outfeed means at the outfeed location.

* * * * *